(12) United States Patent
Nazhan

(10) Patent No.: US 11,255,163 B2
(45) Date of Patent: Feb. 22, 2022

(54) METHODS, SYSTEMS, AND STORAGE MEDIA FOR REMOTE MONITORING OF A SYSTEM USABLE IN A SUBSURFACE VOLUME OF INTEREST

(71) Applicant: CHEVRON U.S.A. INC., San Ramon, CA (US)

(72) Inventor: Anmar Nazhan, Houston, TX (US)

(73) Assignee: CHEVRON U.S.A. INC., San Ramon, CA (US)

(*) Notice: Subject to any disclaimer, the term of this patent is extended or adjusted under 35 U.S.C. 154(b) by 65 days.

(21) Appl. No.: 16/282,253

(22) Filed: Feb. 21, 2019

(65) Prior Publication Data
US 2020/0270971 A1    Aug. 27, 2020

(51) Int. Cl.
| | |
|---|---|
| E21B 41/00 | (2006.01) |
| G01D 7/00 | (2006.01) |
| E21B 45/00 | (2006.01) |
| E21B 47/00 | (2012.01) |
| G08B 21/18 | (2006.01) |

(52) U.S. Cl.
CPC .......... *E21B 41/0092* (2013.01); *E21B 45/00* (2013.01); *E21B 47/00* (2013.01); *G01D 7/00* (2013.01); *G08B 21/182* (2013.01)

(58) Field of Classification Search
CPC ...... E21B 41/0092; E21B 47/00; E21B 45/00; G01D 7/00; G08B 21/182
See application file for complete search history.

(56) References Cited

U.S. PATENT DOCUMENTS

| | | | |
|---|---|---|---|
| 2014/0077963 A1* | 3/2014 | Dankers | E21B 41/0021 340/853.1 |
| 2015/0134257 A1* | 5/2015 | Erge | E21B 44/00 702/9 |
| 2020/0157930 A1* | 5/2020 | Jeffryes | E21B 47/12 |

* cited by examiner

Primary Examiner — Fekadeselassie Girma
Assistant Examiner — Rajsheed O Black-Childress
(74) Attorney, Agent, or Firm — Sheppard, Mullin, Richter & Hampton LLP

(57) ABSTRACT

Methods, systems, and storage media for remote monitoring of a system usable in a subsurface volume of interest are disclosed. Exemplary implementations may: obtain system data for the system usable in the subsurface volume of interest; identify multiple alert times specifying multiple time values corresponding to a time interval where the multiple parameter values exceed a threshold range; generate a representation of the subsurface system using visual effects to depict at least a portion of the system data and at least a portion of the multiple alert times; and display the representation.

19 Claims, 36 Drawing Sheets
(34 of 36 Drawing Sheet(s) Filed in Color)

METHODS, SYSTEMS, AND STORAGE MEDIA FOR REMOTE MONITORING OF A SYSTEM USABLE IN A SUBSURFACE VOLUME OF INTEREST

FIELD OF THE DISCLOSURE

The present disclosure relates to methods, systems, and storage media for remote monitoring of a system usable in a subsurface volume of interest.

SUMMARY

One aspect of the present disclosure relates to a method for remote monitoring of a system usable in a subsurface volume of interest. The method may include obtaining system data for the system usable in the subsurface volume of interest. The system data may specify multiple parameter values corresponding to one or more parameters as a function of time. The method may include identifying multiple alert times specifying multiple time values corresponding to a time interval where the multiple parameter values exceed a threshold range. The method may include generating a representation of the subsurface system using visual effects to depict at least a portion of the system data and at least a portion of the multiple alert times. The method may include displaying the representation.

In implementations, identifying the multiple alert times, generating the representation, and displaying the representation may be dynamic.

In implementations, the one or more parameters may include one or more of a pick-up weight parameter, a slack-off weight parameter, a position parameter, a torque parameter, a run speed parameter, a pressure parameter, a flow rate parameter, a pump rate parameter, a revolution per minute parameter, a weight-on-bit parameter, a hook load parameter, a mud weight parameter, a mud level parameter, a density parameter, a rate of penetration parameter, and a depth return parameter.

In implementations, the system data may be weighted based on an environmental effect on the system.

In implementations, the environmental effect may include one or more of a pump activation and a pump deactivation.

In implementations, system data may be generated by one or more sensors on the system.

In implementations, the one or more sensors may include one or more of a weight sensor, a force sensor, a location sensor, a torque sensor, a pressure sensor, a flow sensor, a revolution per minute sensor, a rotary sensor, a proximity sensor, a hook-load sensor, a pit volume sensor, and a density sensor.

In implementations, the threshold range may be based on a trend of the system data as a function of time.

In implementations, the threshold range may be based on refined system data, wherein the refined system data includes data from a first shift in the data to a second shift in the data.

In implementations, the first shift may be based on a change in a weight from a first part of the system data to a second part of the system data.

In implementations, the threshold range may be based on a maximum parameter value and a minimum parameter value corresponding to safety limits of the system.

In implementations, the threshold range may be a threshold value that varies from the trend by greater than 5%

An aspect of the present disclosure relates to a system configured for remote monitoring of a system usable in a subsurface volume of interest. The system may include non-transient electronic storage, a graphical user interface, and one or more hardware processors configured by machine-readable instructions. The processor(s) may be configured to obtain, from the non-transient electronic storage, system data for the system usable in the subsurface volume of interest. The system data may specify multiple parameter values corresponding to one or more parameters as a function of time. The processor(s) may be configured to identify, with the one or more physical computer processors, multiple alert times specifying multiple time values corresponding to a time interval where the multiple parameter values exceed a threshold range. The processor(s) may be configured to generate, with the one or more physical computer processors, a representation of the subsurface system using visual effects to depict at least a portion of the system data and at least a portion of the multiple alert times. The processor(s) may be configured to display, via the graphical user interface, the representation.

In implementations, identifying the multiple alert times, generating the representation, and displaying the representation may be dynamic.

In implementations, the one or more parameters may include one or more of a pick-up weight parameter, a slack-off weight parameter, a position parameter, a torque parameter, a run speed parameter, a pressure parameter, a flow rate parameter, a pump rate parameter, a revolution per minute parameter, a weight-on-bit parameter, a hook load parameter, a mud weight parameter, a mud level parameter, a density parameter, a rate of penetration parameter, and a depth return parameter.

In implementations, the system data may be weighted based on an environmental effect on the system.

In implementations, the environmental effect may include one or more of a pump activation and a pump deactivation.

In implementations, system data may be generated by one or more sensors on the system.

In implementations, the one or more sensors may include one or more of a weight sensor, a force sensor, a location sensor, a torque sensor, a pressure sensor, a flow sensor, a revolution per minute sensor, a rotary sensor, a proximity sensor, a hook-load sensor, a pit volume sensor, and a density sensor.

An aspect of the present disclosure relates to a non-transient computer-readable storage medium having instructions embodied thereon, the instructions being executable by one or more processors to perform a method for remote monitoring of a system usable in a subsurface volume of interest. The method may include obtaining, from the non-transient electronic storage, system data for the system usable in the subsurface volume of interest. The system data may specify multiple parameter values corresponding to one or more parameters as a function of time. The method may include identifying, with the one or more physical computer processors, multiple alert times specifying multiple time values corresponding to a time interval where the multiple parameter values exceed a threshold range. The method may include generating, with the one or more physical computer processors, a representation of the subsurface system using visual effects to depict at least a portion of the system data and at least a portion of the multiple alert times. The method may include displaying, via the graphical user interface, the representation.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

The patent or application file contains at least one drawings executed in color. Copies of this patent or patent application publication with color drawings will be provided by the Office upon request and payment of the necessary fee.

FIG. 15 illustrates example data alignment, in accordance with one or more implementations.

FIG. 16 illustrates an example pre-stand data check, in accordance with one or more implementations.

DETAILED DESCRIPTION

Figure 1:
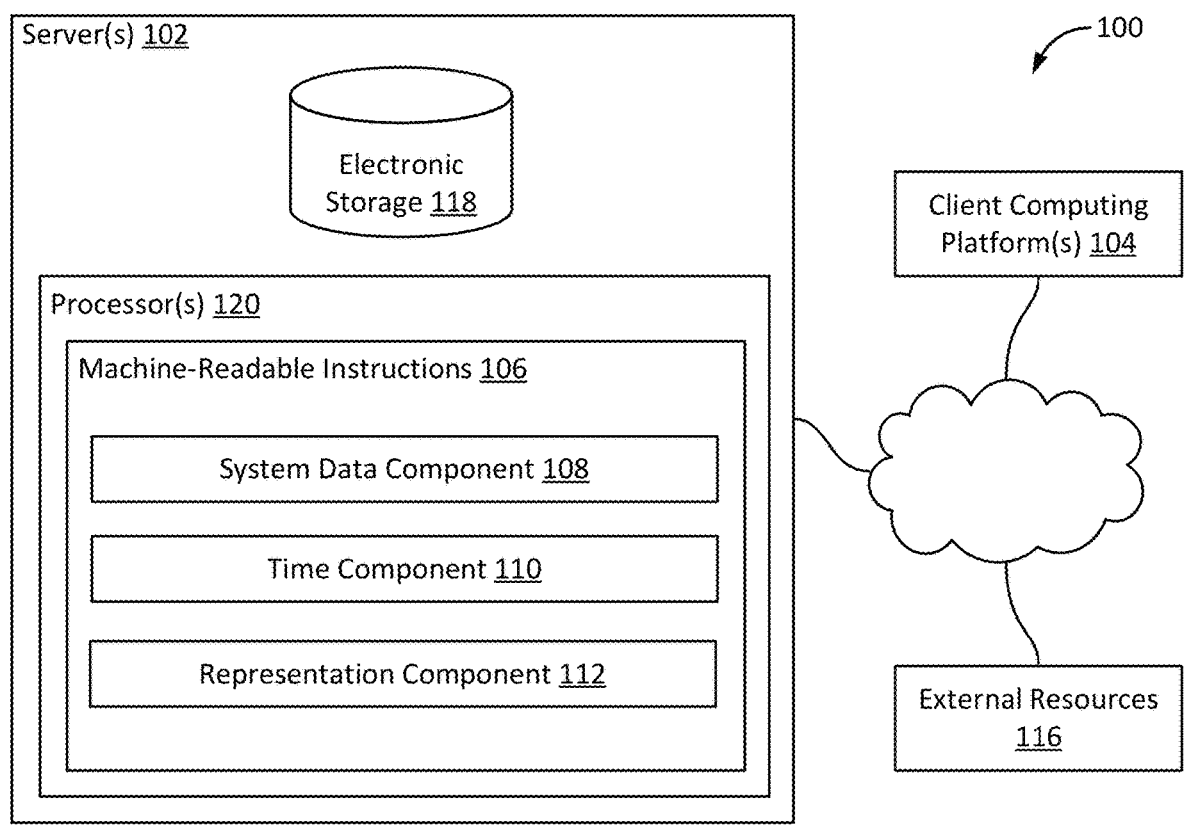
FIG. 1 illustrates a system configured for remote monitoring of a system usable in a subsurface volume of interest, in accordance with one or more implementations.

FIG. 1 illustrates a system 100 configured for remote monitoring of a system usable in a subsurface volume of interest, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction components. The instruction components may include computer program components. The instruction components may include one or more of a system data component 108, a time component 110, a representation component 112, and/or other instruction components.

System data component 108 may be configured to obtain system data for the system usable in the subsurface volume of interest. The subsurface volume of interest may include any area, region, and/or volume underneath a surface. Such a volume may include, or be bounded by, one or more of a water surface, a ground surface, and/or other surfaces. The system data may be weighted based on an environmental effect on the system. The environmental effect may include one or more of a pump activation, a pump deactivation, and/or other environmental effects. The pump activation and pump deactivation may include when a pump is on or off, respectively.

The system data may specify multiple parameter values corresponding to one or more parameters as a function of time. By way of non-limiting example, the one or more parameters may include one or more of a pick-up weight parameter (e.g., one or more depths at which one or more components of the system may be picked up off the bottom of the well during logging), a slack-off weight parameter (e.g., one or more depths at which one or more components of the system may be dropped into a well), a position parameter (e.g., one or more positions of one or more components of the system), a torque parameter (e.g., one or more torques of one or more components of the system), a run speed parameter (e.g., one or more run speeds of one or more components of the system), a pressure parameter (e.g., one or more pressure values of one or more components of the system), a flow rate parameter (e.g., one or more flow rates of one or more fluids flowing through one or more components of the system), a pump rate parameter (e.g., one or more pump rates of one or more fluids flowing through one or more components of the system), a revolutions per minute parameter (e.g., one or more revolutions per minute values of one or more components of the system), a weight-on-bit (WOB) parameter (e.g., one or more weights on a drilling bit and/or other components of the system), a hook load parameter (e.g., one or more forces applied to the one or more components in the system), a mud weight parameter (e.g., a mass per unit volume of a fluid, etc. that may be used in the one or more components in the system), a mud level parameter (e.g., an amount of fluid in the one or more components in the system), a density parameter (e.g., a density of one or more components and/or environmental components of/affecting the system), a rate of penetration (ROP) parameter (e.g., penetration parameter values of one or more components of the system), a depth return parameter (e.g., how much the system and/or one or more components of the system returns from a hole), and/or other parameters.

In implementations, system data may be generated and/or obtained from one or more sensors that may be on the system. By way of non-limiting example, the one or more sensors may include one or more of a weight sensor (e.g., measuring a weight of one or more components in the system), a force sensor (e.g., measuring a force applied on and/or by one or more components in the system), a location sensor (e.g., measuring a location of one or more components in the system), a torque sensor (e.g., measuring a torque caused by and/or on one or more components in the system), a pressure sensor (e.g., measuring a pressure on and/or caused by one or more components in the system), a flow sensor (e.g., measuring a flow rate through the one or more components in the system), a revolutions per minute sensor (e.g., measuring a revolution per minute of the one or more components in the system), a rotary sensor (e.g., measuring a rotation and/or angular positions of the one or more components in the system), a proximity sensor (e.g., measuring a distance from the one or more components in the system to a device and/or object), a hook-load sensor (e.g., measuring a total force applied to the one or more components in the system), a pit volume sensor (e.g., measuring an amount of fluid in a pit), a density sensor (e.g., measuring a density of liquid and/or the one or more components in the system), a gamma ray sensor (e.g., measuring the gamma rays reflected off of one or more surfaces), and/or other sensors.

System data component 108 may be configured to dynamically obtain the system data.

Time component 110 may be configured to identify multiple alert times specifying multiple time values corresponding to a time interval where the multiple parameter values exceed a threshold range. The threshold range may be based on a trend of the system data as a function of time. The trend may be based on refined system data. The refined system data may include data from a first shift in the data to a second shift in the data. The first shift may be based on a change in a weight from a first part of the system data to a second part of the system data. The change in weight may be related to the weighted average that may be prioritized over the normal average. In implementations, the weight may be averaged over a period of time (e.g., 30 seconds, 60 seconds, 120 seconds, 180 seconds, etc.). A percentage may be assigned to a given average over a given period of time corresponding to a trend. A weighted average may be computed which is a total of all averages with their percentages. The weighted average may help identify trends more quickly and reduce the impact of noise in the data. The refined system data may be based on a cause and effect of one or more parameters. For example, if one or more parameters may increase a second parameter, the trend may be an increase in the parameter values. In this example, if the parameter value were to begin decreasing during this trend, an alert may be generated and displayed. It should be appreciated that other algorithms may be used, such as, for example, adaptive control algorithms and/or other algorithms.

In some implementations, the threshold range may be based on a maximum parameter value and a minimum parameter value corresponding to safety limits of the system. The safety limits may be based on the design of the system and the components of the system.

In some implementations, the threshold range may be a threshold value that varies from the trend by greater than 5%. For example, if the trend at a given time was 100, the threshold range would be between 95 and 105. If the one or more parameter values were to exceed 95 or 105, an alert time may be identified for the corresponding time interval.

In implementations, the alert times may correspond to tight hole, or pick-up/slack-off, monitoring (i.e., monitoring that may be based on at least a pick-up weight parameter, a slack-off weight parameter, a position parameter, a torque parameter, a RPM parameter, a flow rate parameter, a pump rate parameter, and/or a depth return parameter), washout monitoring (i.e., monitoring that may be based on at least a pressure parameter, a flow rate parameter, and/or a pump rate parameter), packoff monitoring (i.e., monitoring that may be based on at least a run speed parameter, a pressure parameter, a flow rate parameter, and/or a pump rate parameter), weight stacking monitoring (i.e., monitoring that may be based on at least a position parameter, a torque parameter, a pressure parameter, a flow rate parameter, a pump rate parameter, a RPM parameter, a WOB parameter, and/or a ROP parameter), torque monitoring (i.e., monitoring that may be based on at least a torque parameter and/or a ROP parameter), ROP monitoring (i.e., monitoring that may be based on at least a ROP parameter), reamer tension monitoring (i.e., monitoring that may be based on at least a torque parameter and/or a WOB parameter), running speed monitoring (i.e., monitoring that may be based on at least a running speed parameter), drag monitoring (i.e., monitoring that may be based on at least a pick-up weight parameter, a slack-off weight parameter, a position parameter, a torque parameter, a RPM parameter, a flow rate parameter, a pump rate parameter, a hook load parameter, a mud weight parameter, and/or a depth return parameter), no pipe movement monitoring (i.e., monitoring that may be based on at least a position parameter, a pressure parameter, a RPM parameter, a ROP parameter, and/or a depth return parameter), and/or other monitoring and/or alerts.

In implementations, time component 110 may be configured to dynamically identify the multiple alert times.

Representation component 112 may be configured to generate, with the one or more physical computer processors, a representation of the subsurface system using visual effects to depict at least a portion of the system data and at least a portion of the multiple alert times. The subsurface system may be a drilling system, a logging system, a collection system, and/or other systems to be used in subsurface volumes of interest. The visual effects may refer to a change in presentation of the image on a display and/or in generating the image itself. In some implementations, the visual effects may include one or more visual transformations of the image. In some implementations, a visual transformation may include one or more of a visual zoom, a visual filter, a visual rotation, and/or a visual overlay (e.g., text and/or graphics overlay). For example, FIGS. 4-16, 24-27, 30, 31, 33, and 34-37 illustrate example visual effects used to display the system data and/or other information.

Representation component 112 may be configured to dynamically generate the representation.

Representation component 112 may be configured to display the representation.

Representation component 112 may be configured to dynamically display the representation.

In some implementations, server(s) 102, client computing platform(s) 104, and/or external resources 116 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 116 may be operatively linked via some other communication media.

A given client computing platform 104 may include one or more processors configured to execute computer program components. The computer program components may be configured to enable an expert or user associated with the given client computing platform 104 to interface with system 100 and/or external resources 116, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 116 may include sources of information outside of system 100, external entities participating with system 100, and/or other resources. In some implementations, some or all of the functionality attributed herein to external resources 116 may be provided by resources included in system 100.

Server(s) 102 may include electronic storage 118, one or more processors 120, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 118 may comprise non-transient electronic storage and/or non-transitory storage media that electronically stores information. The electronic storage media of electronic storage 118 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 118 may include one or more virtual storage resources (e.g., cloud storage, a virtual private network, and/or other virtual storage resources). Electronic storage 118 may store software algorithms, information determined by processor(s) 120, information received from server(s) 102, information received from client computing platform(s) 104, and/or other information that enables server(s) 102 to function as described herein.

Processor(s) 120 may be configured to provide information processing capabilities in server(s) 102. As such, processor(s) 120 may include one or more of a physical computer processor, a digital processor, an analog processor, a digital circuit designed to process information, an analog circuit designed to process information, a state machine, and/or other mechanisms for electronically processing information. Although processor(s) 120 is shown in FIG. 1 as a single entity, this is for illustrative purposes only. In some implementations, processor(s) 120 may include a plurality of processing units. These processing units may be physically located within the same device, or processor(s) 120 may represent processing functionality of a plurality of devices operating in coordination. Processor(s) 120 may be configured to execute components 108, 110, and/or 112, and/or other components. Processor(s) 120 may be configured to execute components 108, 110, and/or 112, and/or other components by software; hardware; firmware; some combination of software, hardware, and/or firmware; and/or other mechanisms for configuring processing capabilities on processor(s) 120. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, and/or 112 are illustrated in FIG. 1 as being implemented within a single processing unit, in implementations in which processor(s) 120 includes multiple processing units, one or more of components 108, 110, and/or 112 may be implemented remotely from the other components. The description of the functionality provided by the different components 108, 110, and/or 112 described below is for illustrative purposes, and is not intended to be limiting, as any of components 108, 110, and/or 112 may provide more or less functionality than is described. For example, one or more of components 108, 110, and/or 112 may be eliminated, and some or all of its functionality may be provided by other ones of components 108, 110, and/or 112. As one example, processor(s) 120 may be configured to execute one or more additional components that may perform some or all of the functionality attributed below to one of components 108, 110, and/or 112.

Figure 2:
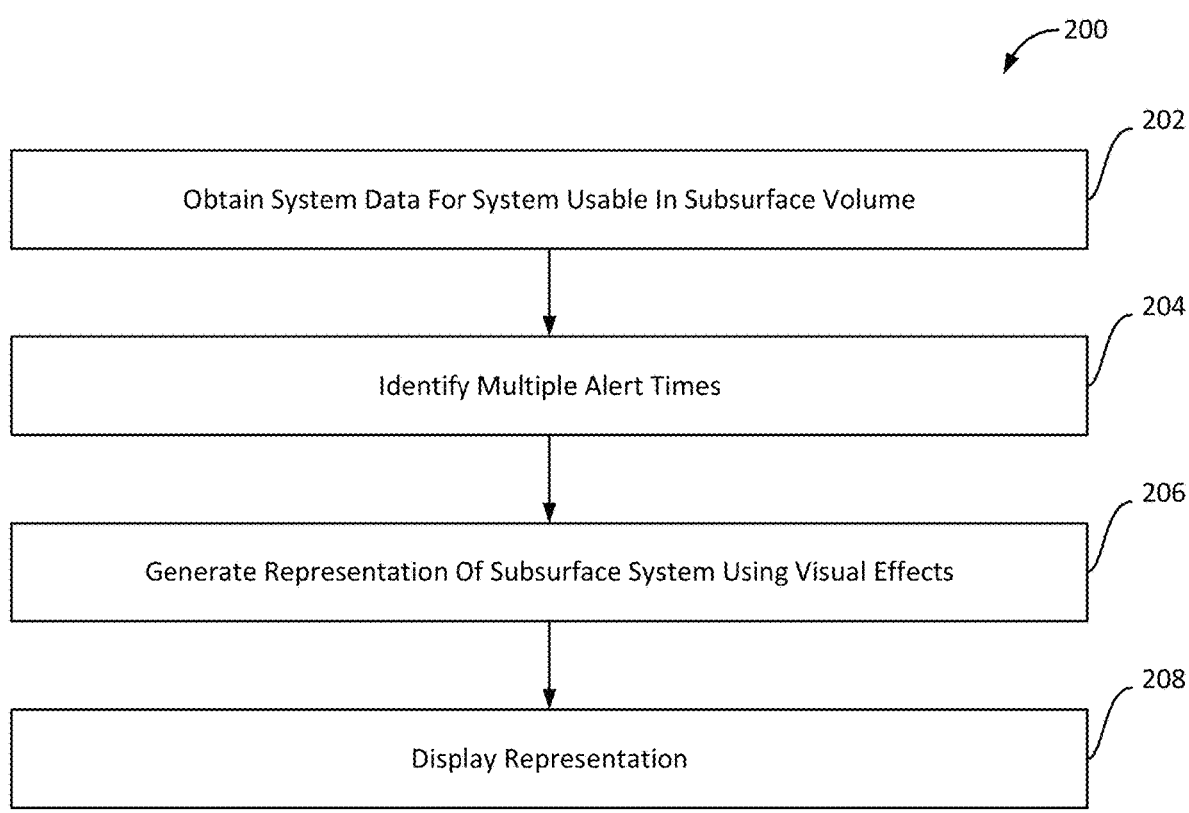
FIG. 2 illustrates a method for remote monitoring of a system usable in a subsurface volume, in accordance with one or more implementations.

FIG. 2 illustrates a method 200 for remote monitoring of a system usable in a subsurface volume of interest, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a physical computer processor, a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include obtaining system data for the system usable in the subsurface volume of interest. The system data may specify multiple parameter values corresponding to one or more parameters as a function of time. In some implementations, the system data may be weighted based on an environmental effect on the system. The environmental effect may include one or more of a pump activation and a pump deactivation. In implementations, the system data may be generated by one or more sensors on the system. Operation 202 may be performed by one or more hardware processors configured by machine-readable instructions including a component that is the same as or similar to system data component 108, in accordance with one or more implementations.

An operation 204 may include identifying multiple alert times specifying multiple time values corresponding to a time interval where the multiple parameter values exceed a threshold range. The threshold range may be based on a trend of the system data as a function of time. In implementations, the threshold range may be based on refined system data. The refined system data may include data from a first shift in the data to a second shift in the data. In some implementations, the first shift may be based on a change in a weight from a first part of the system data to a second part of the system data. In some implementations, the threshold range is based on a maximum parameter value and a minimum parameter value corresponding to safety limits of the system. In implementations, the threshold range may be a threshold value that varies from the trend by greater than 5%. Operation 204 may be performed by one or more hardware processors configured by machine-readable instructions including a component that is the same as or similar to time component 110, in accordance with one or more implementations.

An operation 206 may include generating a representation of the subsurface system using visual effects to depict at least a portion of the system data and at least a portion of the multiple alert times. Operation 206 may be performed by one or more hardware processors configured by machine-readable instructions including a component that is the same as or similar to representation component 112, in accordance with one or more implementations.

An operation 208 may include displaying the representation. Operation 208 may be performed by one or more hardware processors configured by machine-readable instructions including a component that is the same as or similar to representation component 112, in accordance with one or more implementations.

In implementations, the one or more operations may be performed dynamically, in real-time.

Figure 3:
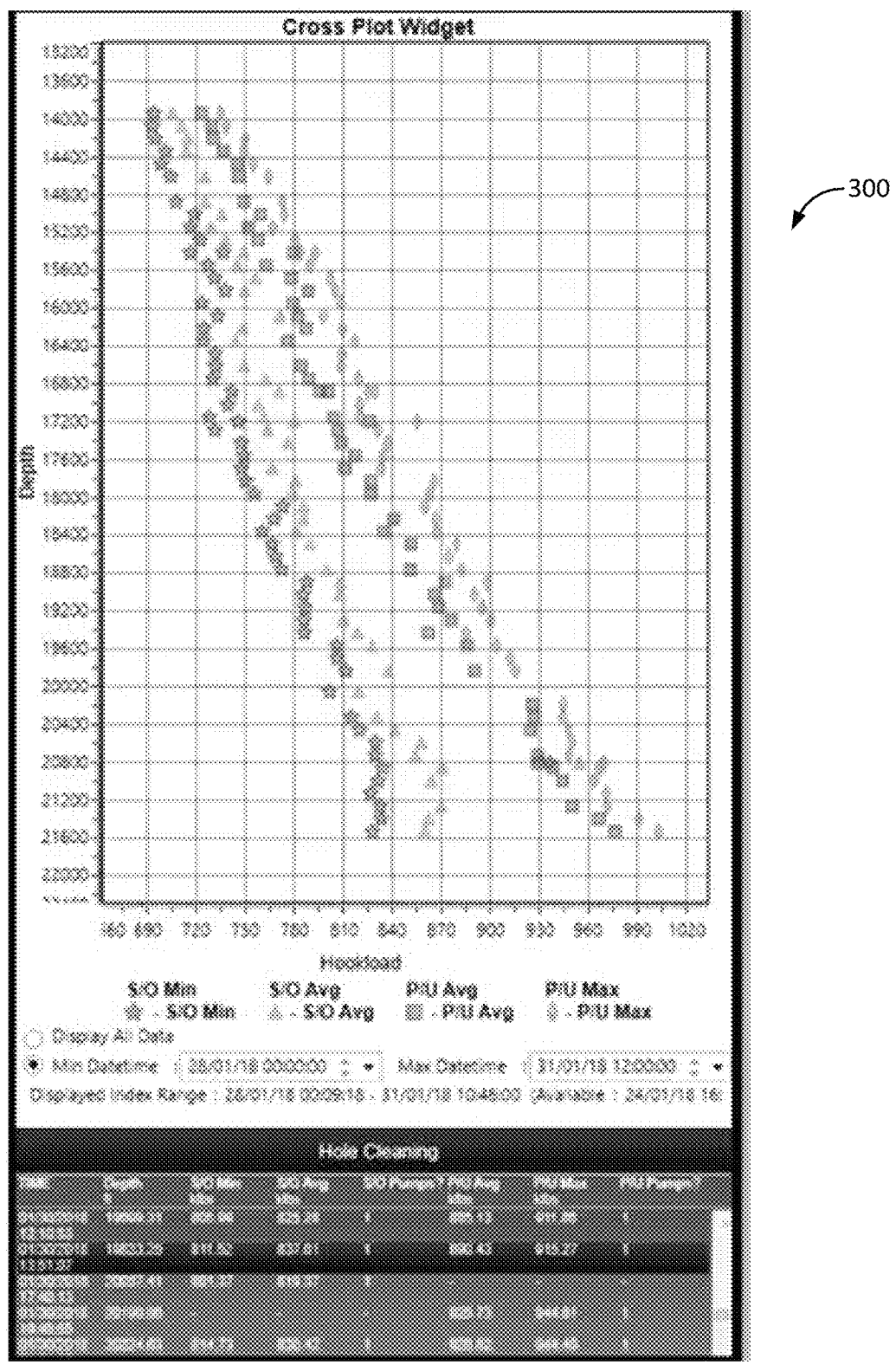
FIG. 3 illustrates an example plot of an example monitoring system, in accordance with one or more implementations.

FIG. 3 illustrates an example plot of an example monitoring system, in accordance with one or more implementations. As illustrated, example user interface 300 may be depicted. Example user interface 300 may represent pick-up and slack-off monitoring, or tight hole monitoring. The y axis may represent depth values and the x axis may represent hook load values. The pick-up and slack-off monitoring may be for drilling operations and/or tripping operations. For example, the monitor may generate and display an alert when the drilling operations may use a bit depth within about 150 feet from the hole depth. The RPM may be less than about 5 RPM. The pumps may be on or off and the system data may be collected and/or alarms may be generated and displayed. Pick-up and/or slack-off values may be calculated (e.g., min, max, avg). For tripping operations, an alert may be generated when the bit depth exceeds about 800 feet and a hole depth of about 150 feet. An alert may be generated when the RPM may be less than about 5 RPM. As with the pick-up and slack-off, the pumps may be on or off and the system data may be collected. Pick-up and/or slack-off values may be calculated (e.g., min, max, avg). In implementations, a trend may be identified and an alert time may be generated if the trend deviates outside a threshold range.

Figure 4:
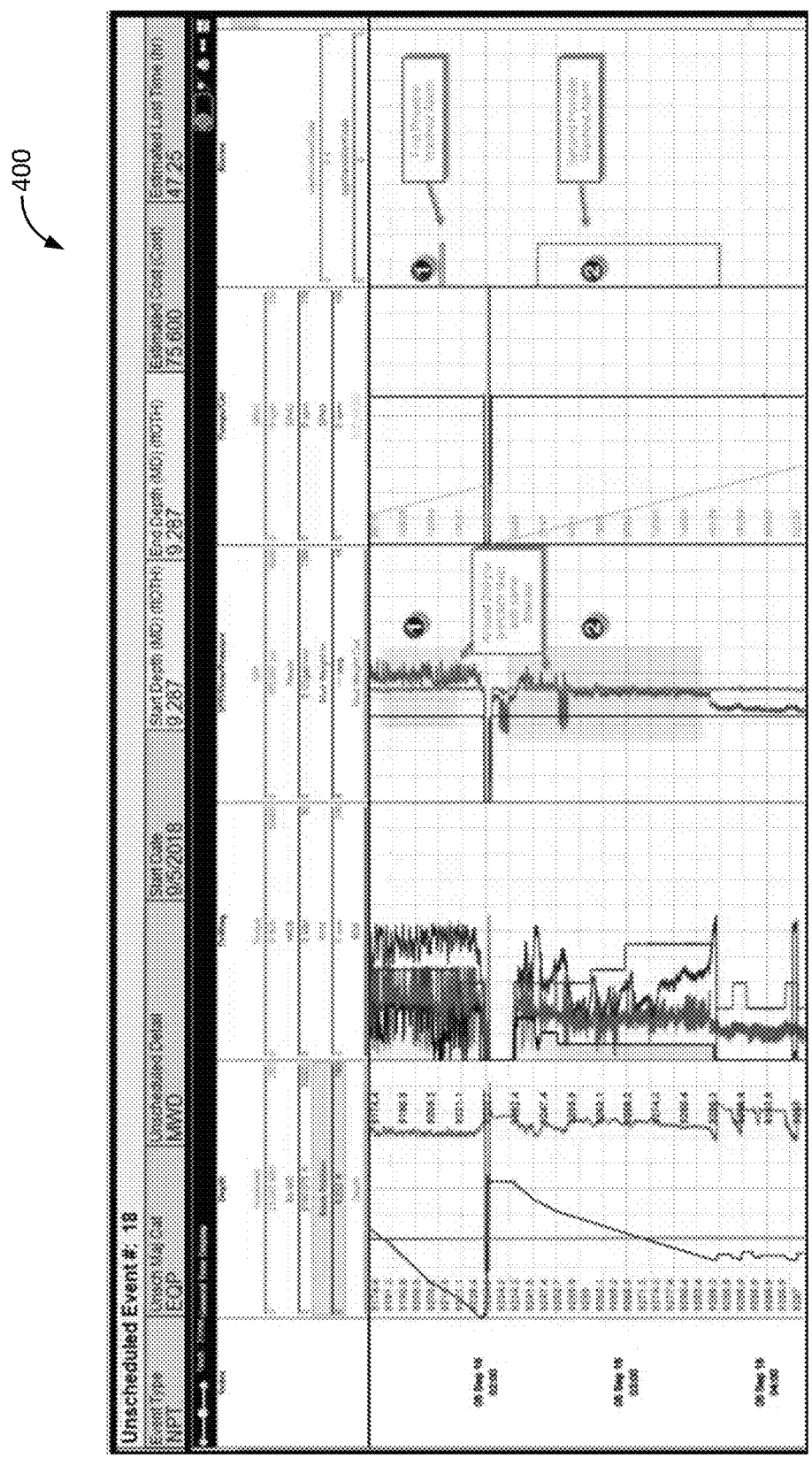
FIG. 4 illustrates an example plot of an example monitoring system, in accordance with one or more implementations.

FIG. 4 illustrates an example plot of an example monitoring system, in accordance with one or more implementations. As illustrated, example user interface 400 may be depicted. Example user interface 400 may include plots of a time index, depth values, drilling values, standpipe press (SPP)/flow/pressure values, active pit total/TTK values, pumps/circ values, alarms, and/or other information. The plot may represent washout monitoring. The far right graph may represent alarms generated based on changes to the one or more parameter values. For example, the SPP/flow/pressure values may change from an existing trend. This example washout monitoring may generate and display an alarm when changes to the trend exceed a threshold range corresponding to (1) and (2). The alarm was able to identify the about 200 psi pressure drop with the same flowrate. Even with the SPP/flow/pressure values plotted, it may be very difficult to understand where relevant deviations are occurring without the alarms generated from the presently disclosed technology. Existing technology may present the data in a spreadsheet, without any visual graphs. As illustrated, additional information may be generated using the presently disclosed technology, such as, for example, start date, start depth, end depth, estimated cost, estimated lost time, etc.

Figure 5:
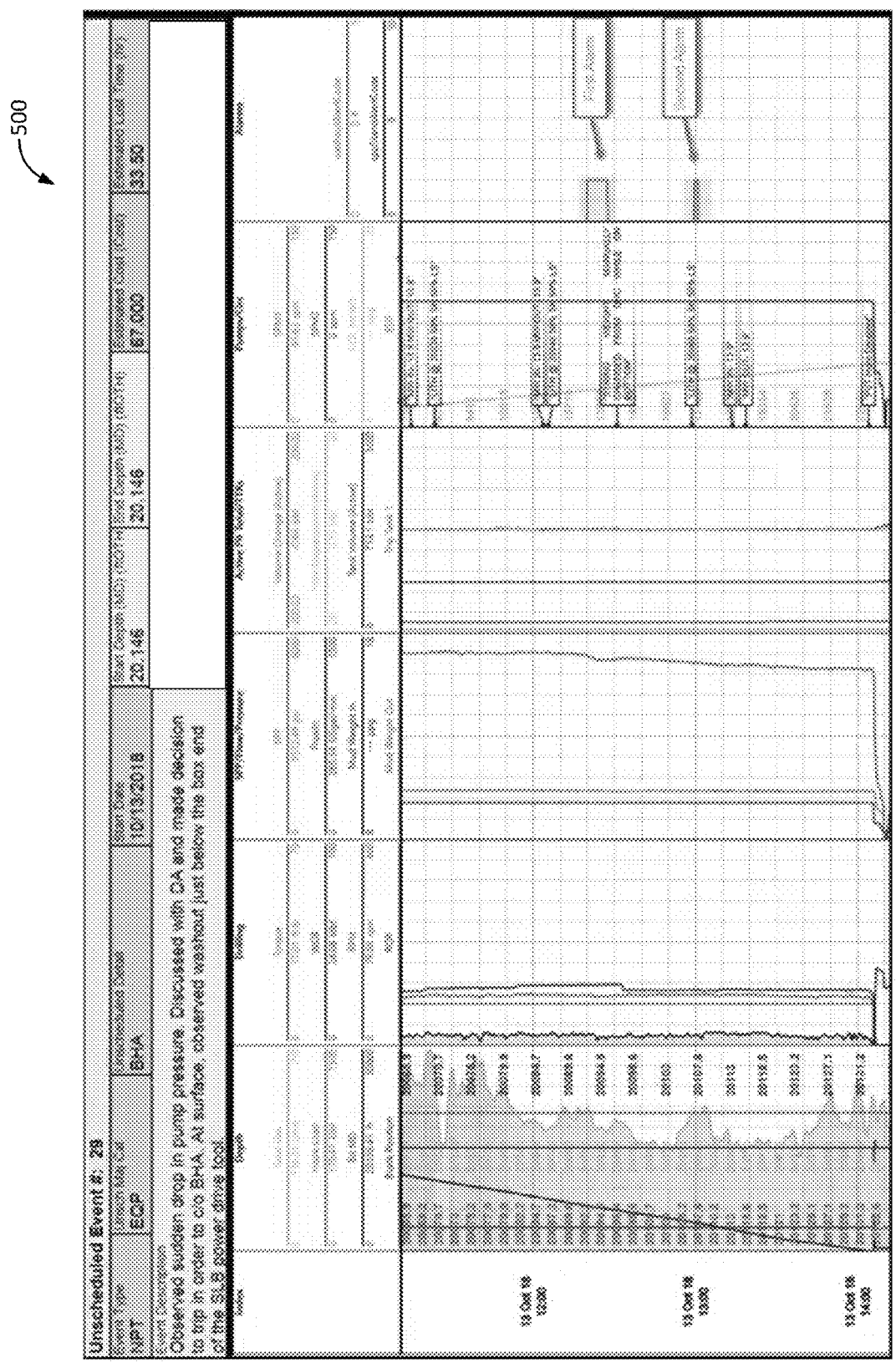
FIG. 5 illustrates an example plot of an example monitoring system, in accordance with one or more implementations.

FIG. 5 illustrates an example plot of an example monitoring system, in accordance with one or more implementations. As illustrated, example user interface 500 may be depicted. Example user interface 500 may represent washout monitoring. The far right graph may represent alarms generated based on changes to the one or more parameter values. For example, the pump pressure values may have exceeded the threshold range from the trend. This example washout monitoring may generate and display an alarm when changes to the trend exceed a threshold range corresponding to (first alarm) and (second alarm). Additional information in the user interface may include, in addition to those described above, an input area for explanation of why the alarms may have been generated.

Figure 6:
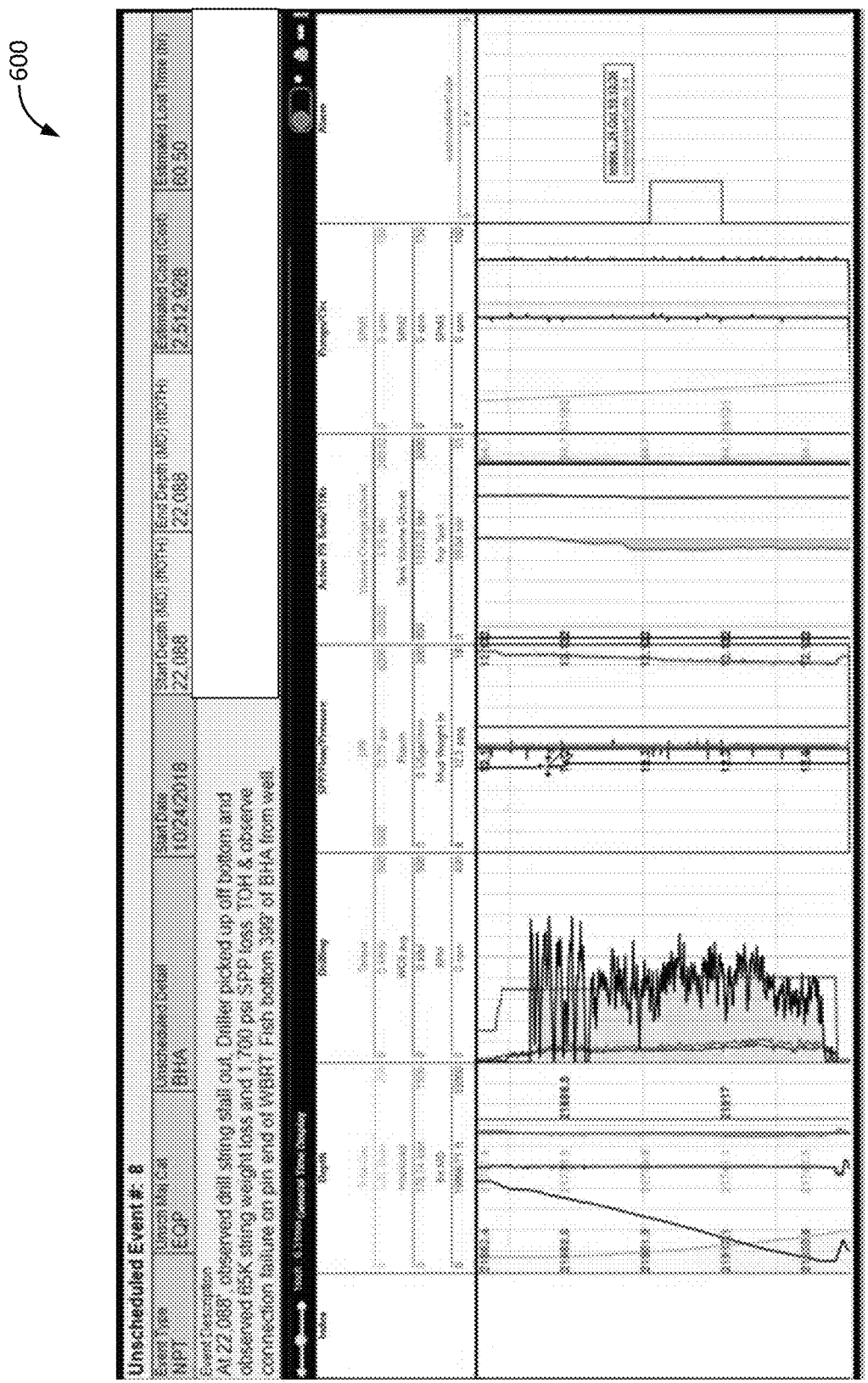
FIG. 6 illustrates an example plot of an example monitoring system, in accordance with one or more implementations.

FIG. 6 illustrates an example plot of an example monitoring system, in accordance with one or more implementations. As illustrated, example user interface 600 may be depicted. Example user interface 600 may represent washout monitoring. The far right graph may represent alarms generated based on changes to the one or more parameter values. For example, at a given depth, a string weight loss may be about 65000 and there may be about a 1700 psi SPP loss. This example washout monitoring may generate and display an alarm when changes to the trend exceed a threshold range corresponding to (index: 24 Oct. 18 12:30).

Figure 7:
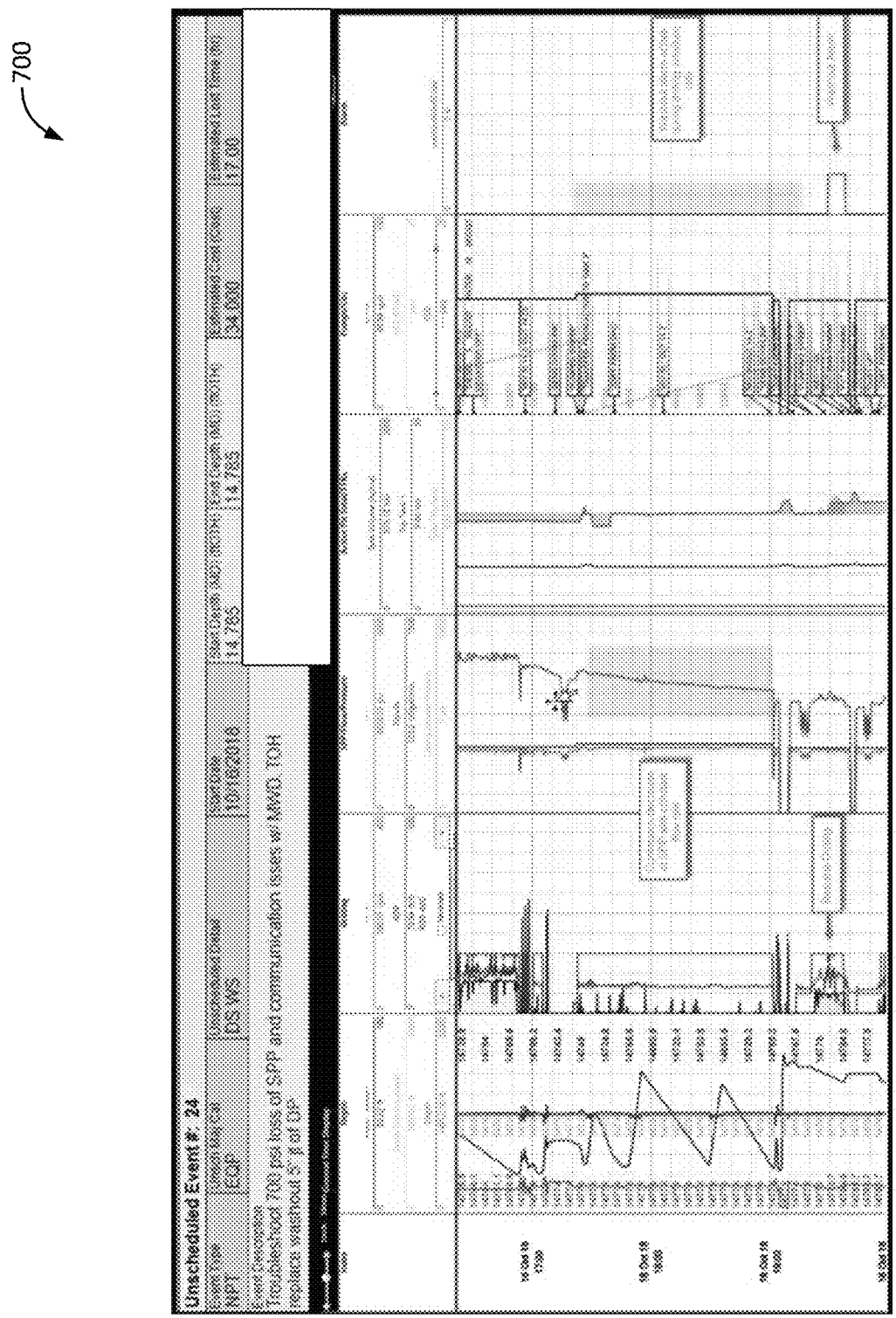
FIG. 7 illustrates an example plot of an example monitoring system, in accordance with one or more implementations.

FIG. 7 illustrates an example plot of an example monitoring system, in accordance with one or more implementations. As illustrated, example user interface 700 may be depicted. Example user interface 700 may represent washout monitoring. The far right graph may represent alarms generated based on changes to the one or more parameter values. In implementations, the washout monitoring, or alarm, may be active during drilling activities. For example, about a 700 psi SPP loss may be observed. This example washout monitoring may generate and display an alarm when changes to the trend exceed a threshold range corresponding to (washout alarm).

Figure 8:
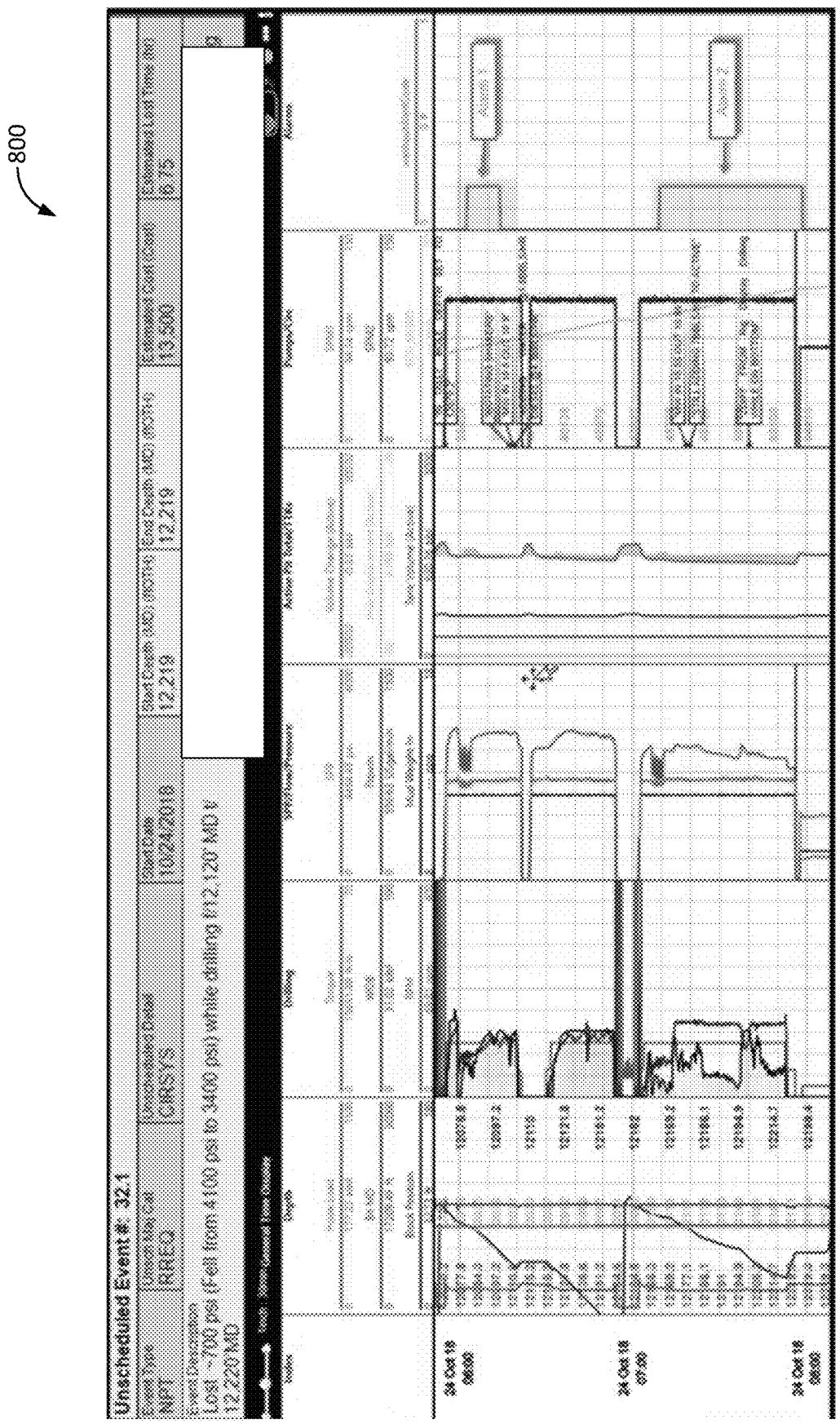
FIG. 8 illustrates an example plot of an example monitoring system, in accordance with one or more implementations.

FIG. 8 illustrates an example plot of an example monitoring system, in accordance with one or more implementations. As illustrated, example user interface 800 may be depicted. Example user interface 800 may represent washout monitoring. The far right graph may represent alarms generated based on changes to the one or more parameter values. For example, about 700 psi SPP may be lost (e.g., about 4100 to about 3400 psi) while drilling. This example washout monitoring may generate and display an alarm when changes to the trend exceed a threshold range corresponding to (Alarm 1) and (Alarm 2).

Figure 9:
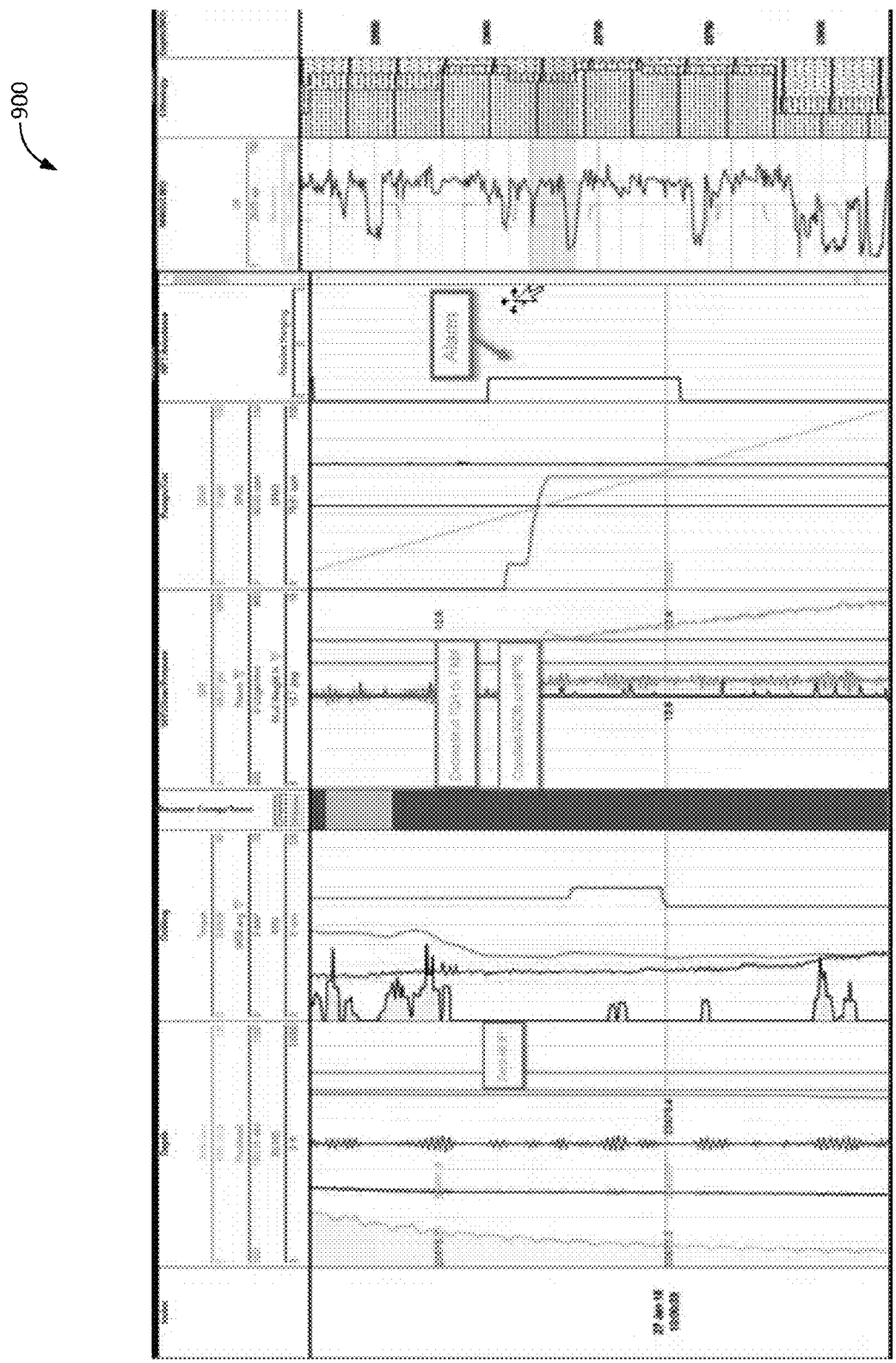
FIG. 9 illustrates an example plot of an example monitoring system, in accordance with one or more implementations.

FIG. 9 illustrates an example plot of an example monitoring system, in accordance with one or more implementations. As illustrated, example user interface 900 may be depicted. In addition to above user interfaces, example user interface 900 may include MWD/LWD parameters, lithology, WOB, and/or other information. The example user interface may represent weight stacking monitoring. For example, the monitor may generate and display an alert when the ROP goes to 0, the WOB may be constant or may be increasing, the RPM may be constant, and there is a decrease exceeding a threshold value in torque. The torque may decrease at (Decrease in TQA by 7 kbf) while the WOB and RPM may be constant. When ROP goes to zero, this may indicate drilling has stopped (e.g., (zero ROP)). The (NPT Avoidance) plot may represent alarms generated based on changes to the one or more parameter values. This example weight stacking monitoring may generate and display an alarm when changes to the trend exceed a threshold range corresponding to (Alarm).

Figure 10:
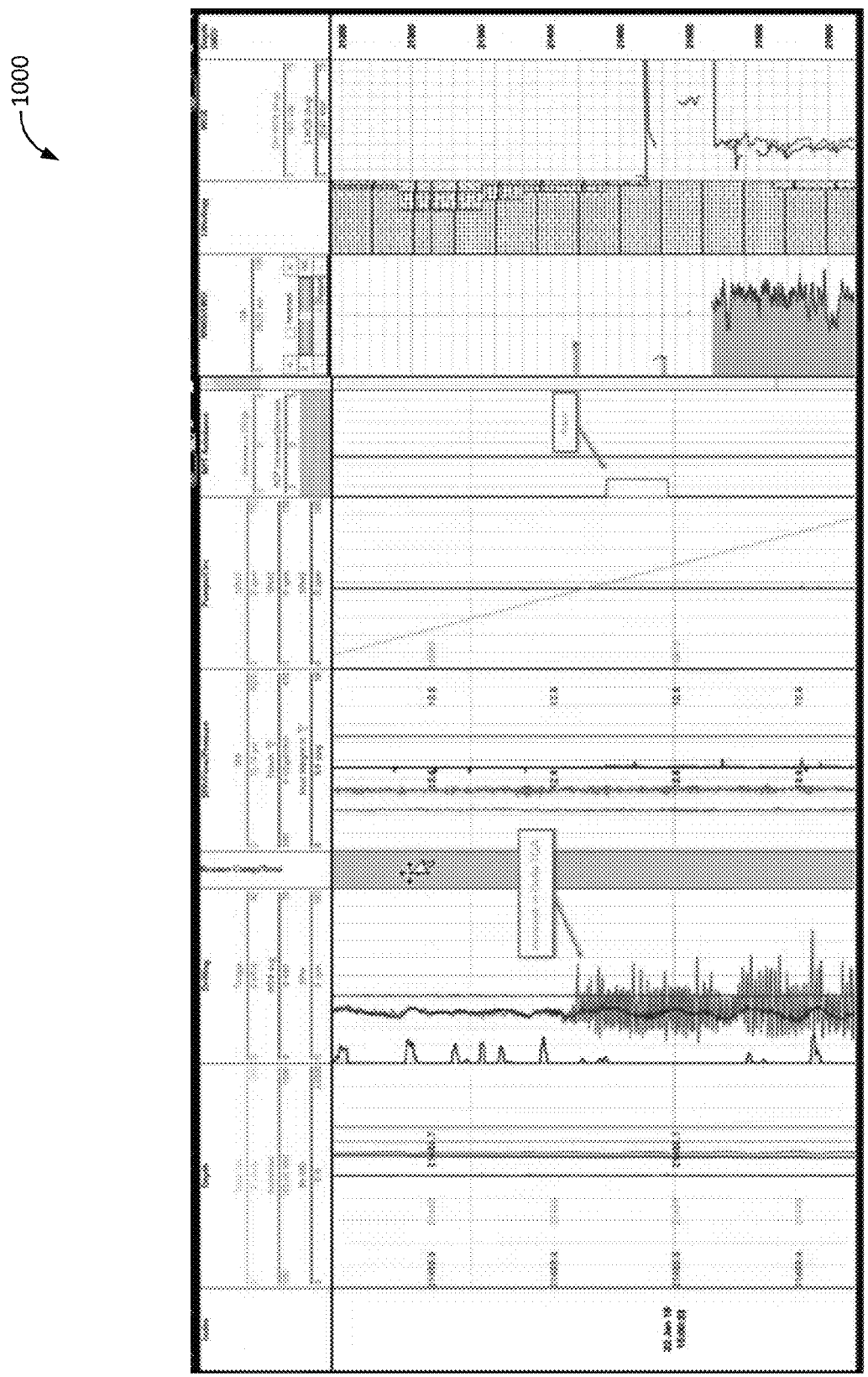
FIG. 10 illustrates an example plot of an example monitoring system, in accordance with one or more implementations.

FIG. 10 illustrates an example plot of an example monitoring system, in accordance with one or more implementations. As illustrated, example user interface 1000 may be depicted. Example user interface 1000 may represent torque monitoring. For example, the torque monitoring may be based on, at least, a delta torque exceeding a threshold value. The torque may increase at (Increase in Delta TQA). The (NPT Avoidance) plot may represent alarms generated based on changes to the one or more parameter values. This example torque monitoring may generate and display an alarm when changes to the trend exceed a threshold range corresponding to (Alarm). This may help identify changes in lithologies and/or subsurface features.

Figure 11:
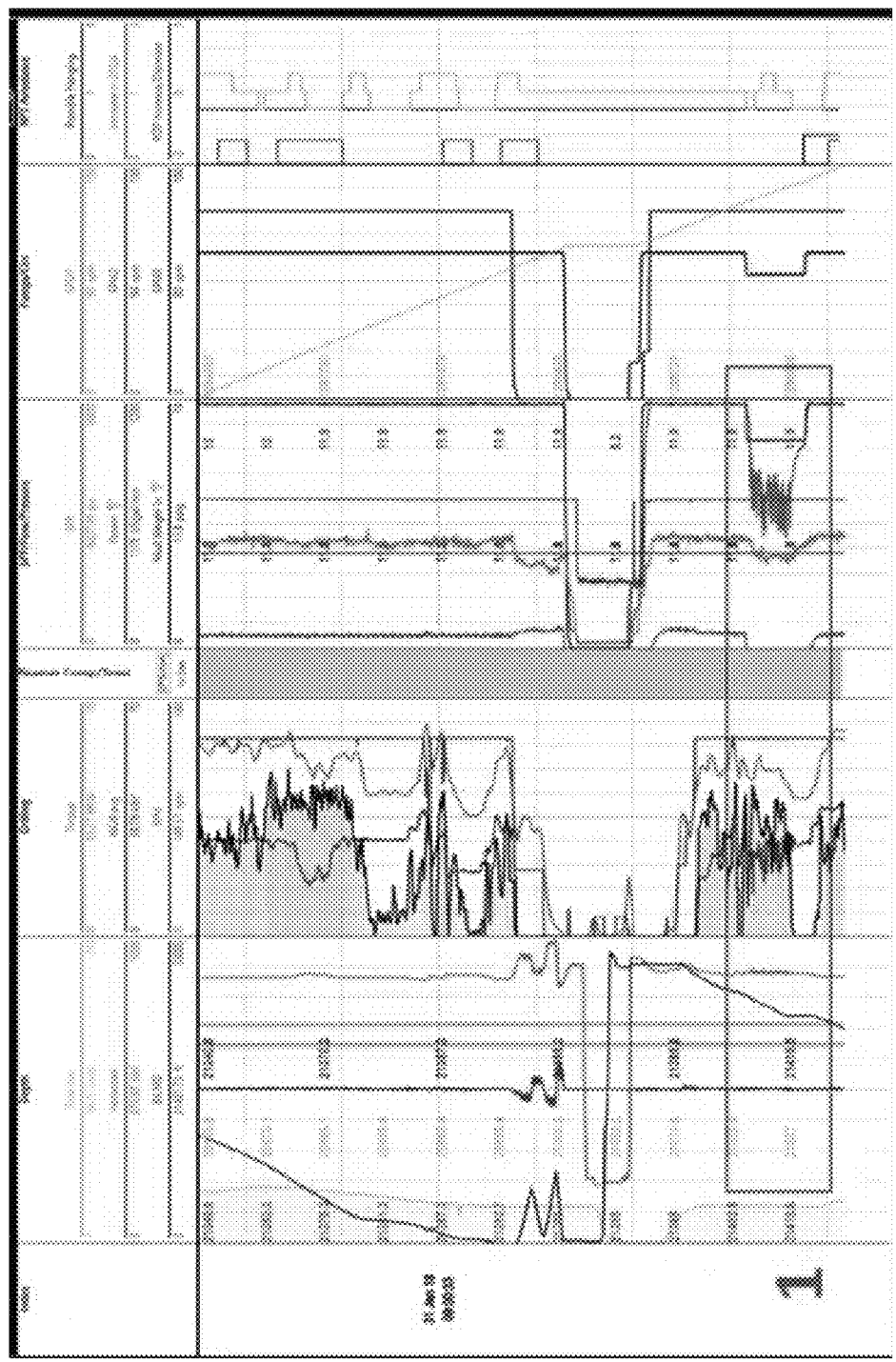
FIG. 11 illustrates an example plot of an example monitoring system, in accordance with one or more implementations.

FIG. 11 illustrates an example plot of an example monitoring system, in accordance with one or more implementations. As illustrated, example user interface 1100 may be depicted. Example user interface 1100 may represent weight stacking monitoring. For example, the (NPT Avoidance) plot may represent alarms generated based on changes to the one or more parameter values (e.g., torque, ROP, etc.). This example weight stacking monitoring may generate and display an alarm when changes to the trend exceed a threshold range.

Figure 12:
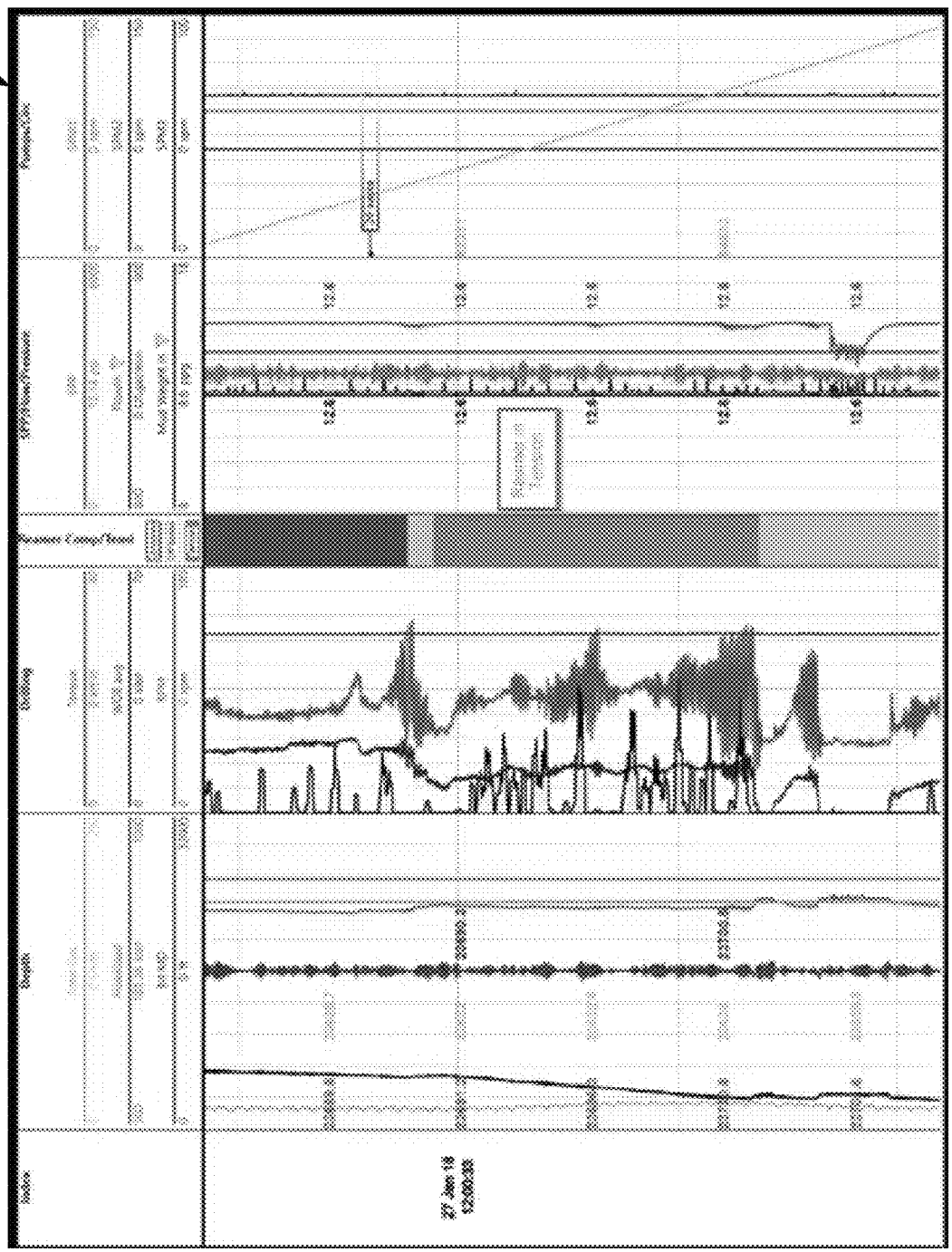
FIG. 12 illustrates an example plot of an example monitoring system, in accordance with one or more implementations.

FIG. 12 illustrates an example plot of an example monitoring system, in accordance with one or more implementations. As illustrated, example user interface 1200 may be depicted. Example user interface 1200 may represent reamer tension monitoring. For example, the monitor may generate and display an alert when an average WOB over a period of time (e.g., about 2 minutes) is less than a neutral weight. The reamer may be in tension at (Reamer in Tension). The (Reamer Comp/Tensi) plot may represent alarms generated based on changes to the one or more parameter values. This example reamer tension monitoring may generate and display an alarm when changes to the trend exceed a threshold range corresponding to (Reamer in Tension).

Figure 13:
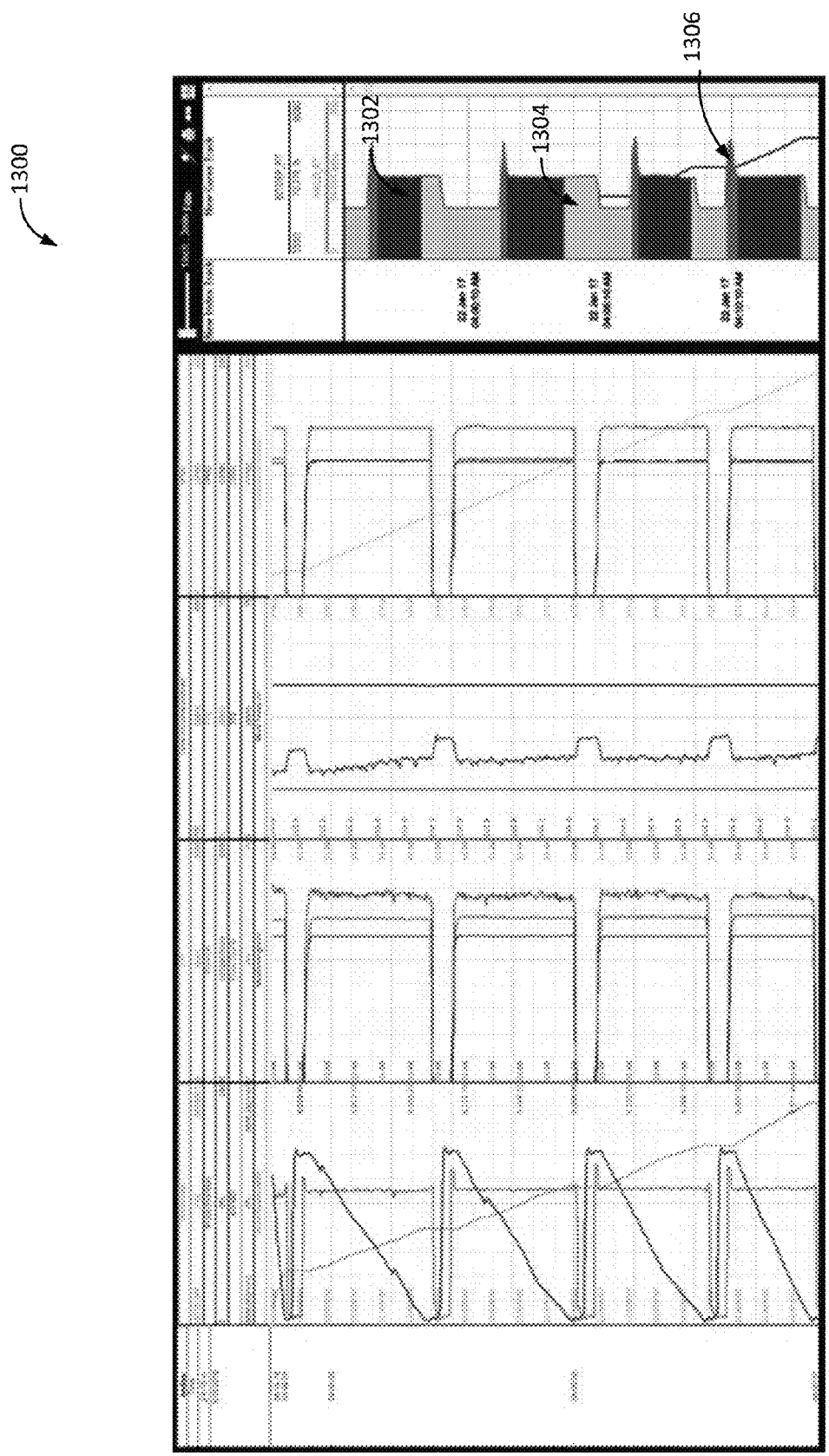
FIG. 13 illustrates an example plot of an example monitoring system, in accordance with one or more implementations.

FIG. 13 illustrates an example plot of an example monitoring system, in accordance with one or more implementations. As illustrated, example user interface 1300 may be depicted. Example user interface 1300 may represent drag monitoring. The far right graph may represent alarms generated based on changes to the one or more parameter values. For example, the monitor may generate and display an alert when a parameter value exceeds a threshold value for a period of time. The parameter values may be filtered based on different times. For example, peaks 1306 and dips 1304 may not be included as relevant data, which may correspond to initial pickup hook loads and ending hook loads, respectively. Areas 1302 may represent the remaining data that corresponds with the hook load running. The plot may represent alarms generated based on changes to the one or more parameter values. This example drag monitoring may generate and display an alarm when changes to the trend exceed a threshold range.

Figure 14:
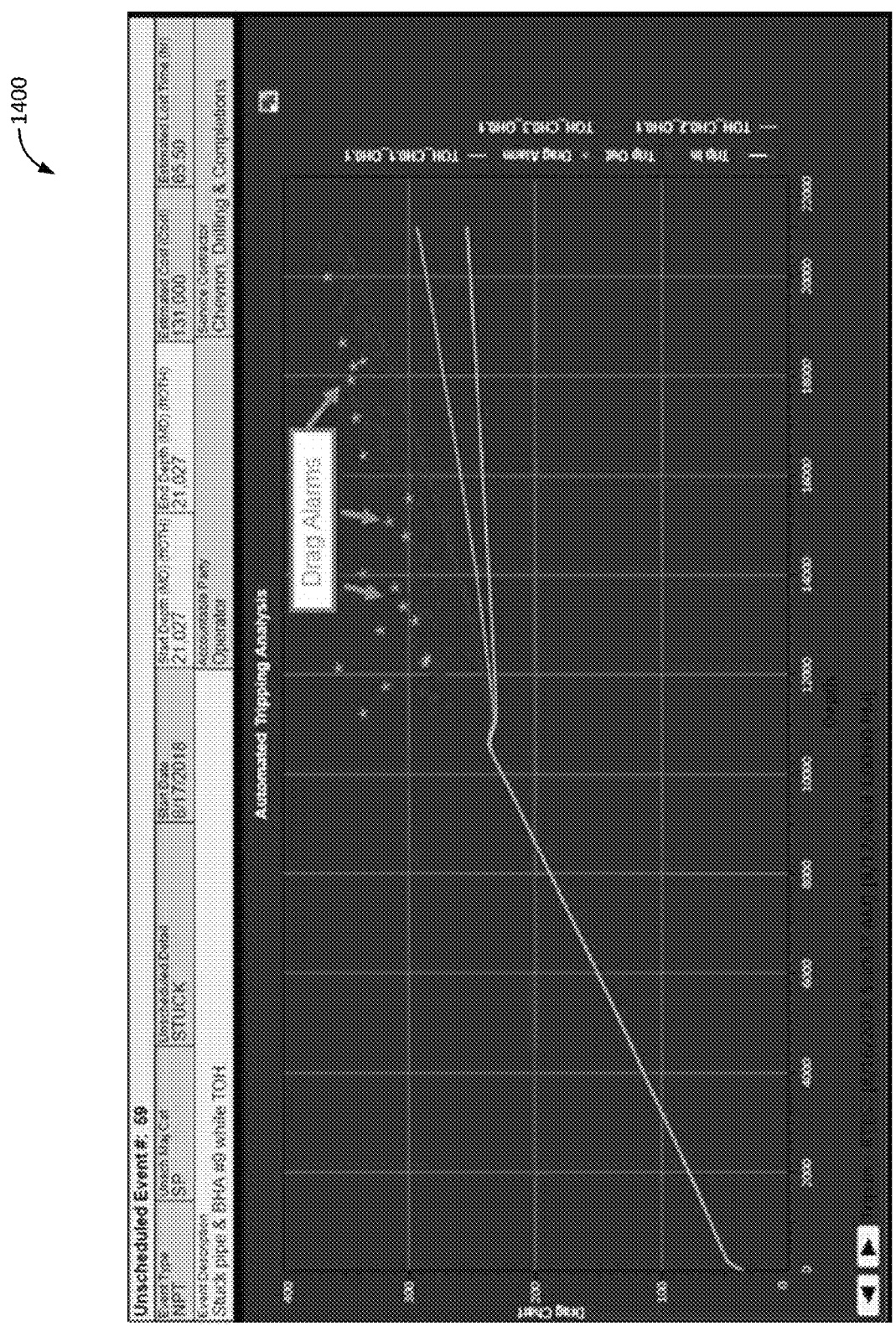
FIG. 14 illustrates an example plot of an example monitoring system, in accordance with one or more implementations.

FIG. 14 illustrates an example plot of an example monitoring system, in accordance with one or more implementations. As illustrated, example user interface 1400 may be depicted. Example user interface 1400 may represent drag monitoring. The plot may represent system data, filtered data, and/or alarms. For example, the monitor may generate and display an alert based on filtered data, as described above. The plot may represent alarms generated based on changes to the one or more parameter values. This example drag monitoring may generate and display an alarm when changes to the trend exceed a threshold range corresponding to (Drag Alarms) represented as stars.

In implementations, example monitoring systems may include abnormal versus calculated gain while drilling, gaining in an active system while circulating, losses in an active system while drilling and/or circulating, accelerated gain in an active system while drilling and/or circulating, increase in hole displacement over a given number of stands, and/or other example monitoring systems.

For example, one workflow for an example monitoring system may include identifying any over/under displacement in the active system and/or the total pits volume during drilling and circulation operations. The workflow may include identifying any gradual over/under displacement in the active system and/or the total pits over a long period of time during drilling and/or circulation operations. The workflow may include generating a hole displacement curve during drilling operations for real-time monitoring purposes. This may include calculating the theoretical displacement in real-time and comparing it with the actual displacement in the active system and/or the total pits while accounting for one or more factors (e.g., hole size, drill pipe steal displacement, rate of penetration, amount of cuttings displaced out of the hole while drilling, surface volume, active system pit assignment (adding/remove pit(s)), flow rate changes, depth adjustment (e.g., bit depth, hole depth and/or lag depth), fluctuations in the active system and/or total pits, fluid transfers from/to active system, and/or other factors).

The workflow may include distinguishing between riser and riserless operations for offshore rigs. The workflow may include compensating for the time required for the active system to level after sudden pipe movements (pickup and/or slack-off). The workflow may include generating one alarm per event unless one or more scenarios occur, such as, for example, continuous gain in the active system and/or total pits over long period of time; increase in rate of returns while adding fluid to the active system and/or total pits during drilling and/or circulation operations; and/or other scenarios. The workflow may include comparing the displacement of each stand with the previous ones and generating an alert in case of trend changes during losses over a given number of stands. The workflow may include aligning all the channels from different logs with different data frequency prior to performing any calculations. The workflow may include checking the validity of the data input channels prior to performing any calculations.

In implementations, an example monitoring system may include a gain/loss while drilling monitoring system. The gain/loss while drilling monitoring system may be calculated based on hole size, drill pipe steal displacement, rate of penetration, amount of cuttings displaced out of the hole while drilling, surface volume, active system pit assignment (adding/remove pit(s)), flow rate changes, depth adjustment (bit depth, hole depth and lag depth), fluctuations in the active system and/or total pits, fluid transfers from/to active system, and/or other factors. The data may be displayed on a graphical user interface. In embodiments, the display may include a real-time channel for real-time display. The gain/loss while drilling monitoring system may obtain lag depth, bit depth, active systems, strokes per minute (SPM(s)), block position, and/or other data. Based on the obtained data, rig activity codes, drilling elapsed time, circulation elapsed time, total pits, and/or other information may be calculated. The gain/loss while drilling monitoring system may include constant hole size, drill pipe displacements, and/or other constants.

Figures 15, 16:
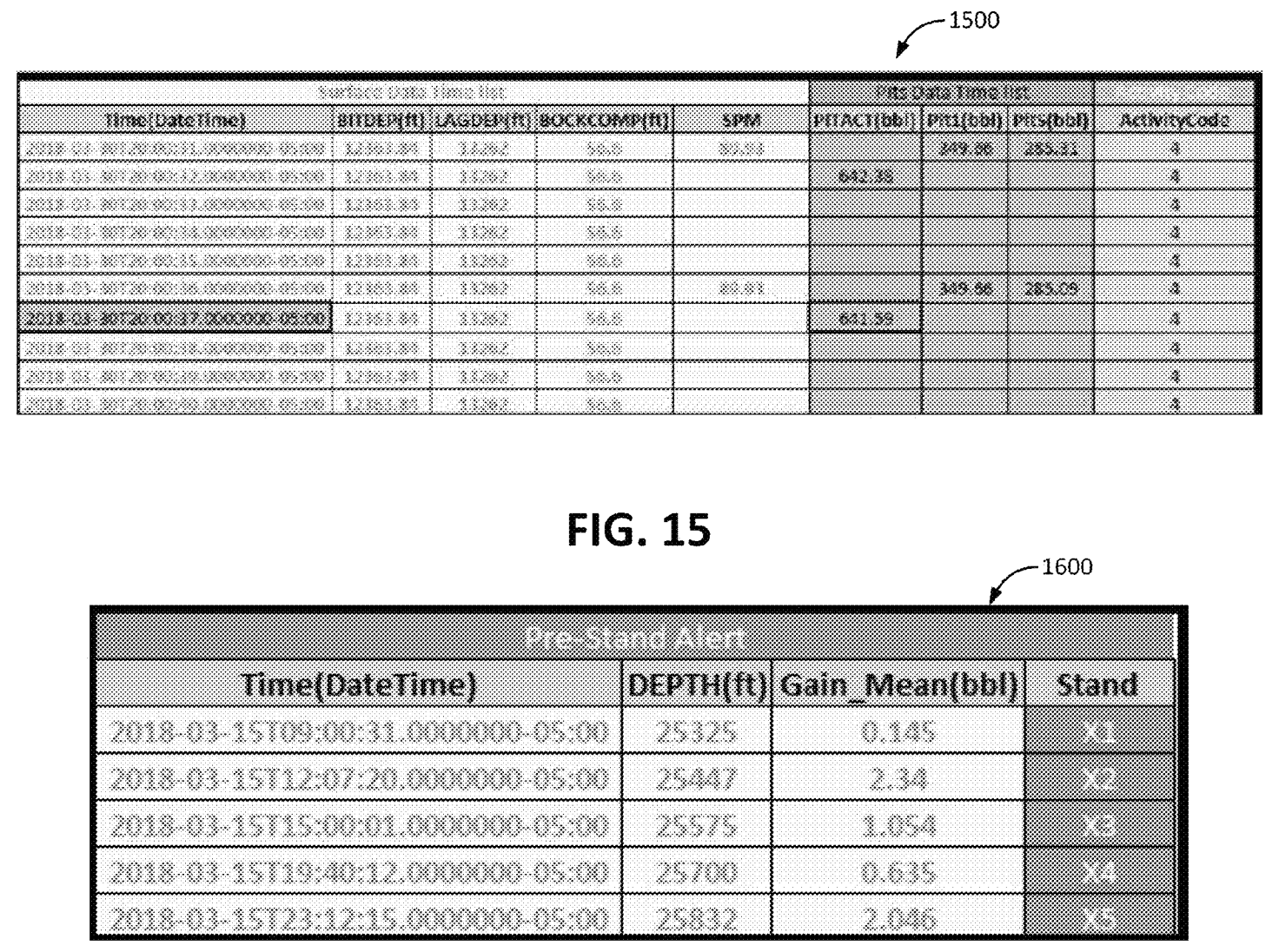

In implementations, the gain/loss while drilling monitoring system may include an index alignment component. FIG. 15 illustrates example data alignment, in accordance with one or more implementations. The index alignment component may include grouping all curves per input channel object into lists. The lists may include a surface data time list that includes lag depth, bit depth, block position, SPM(s), and/or other data; a pits data time list that includes active system, pit(s), and/or other data; and an activity code list that includes rig activity code and/or other data; and/or other lists. In some implementations, the most recently updated value in each list may be identified. A least time index may be determined. The time index may be stored in memory. As illustrated, the surface data time list may have a channel that updates about every 5 secs while the other channels update about every 1 sec. In implementations, indexing may not consider any data points beyond the highlighted time index.

In some implementations, the gain/loss while drilling monitoring system may include a pre-stand alert component. The pre-stand alert component may include checking if new data in the pre-stand alert list exists. The number of data points may be relevant if a new value is found. For example, if three data points (e.g., each data point may represent a stand) may be available, but less than 5 data points are available, the difference between the last data point and the first data point may be compared (i.e., X3−X1). If the difference is greater than a threshold value, additional conditions may be checked (e.g., X1>X2, X2>X3 and X1, X2, and X3 are less than about −5). If one or more conditions are met, a value of 1 for the pre-stand alert code may be generated, and it may remain active for a period of time (e.g., about 1 minute). In implementations, if 5 data points are available then generate a value of 1 for pre-stand alert code, and it may remain active for a period of time (e.g., about 1 minute). FIG. 16 illustrates an example pre-stand data check, in accordance with one or more implementations. Five stands, or data points, are illustrated with a corresponding time, depth, and gain.

In implementations, the gain/loss while drilling monitoring system may include a data processing component. The data processing component may include determining invisible boundaries for the active system channel. This may help stabilize the cumulative and instantaneous hole displacement values. Determining invisible boundaries for the active system channel may include one or more operations. One operation may include getting about a 5 min median for the active system. One operation may include determining an erratic rating. In some implementations, the erratic rating may be based on determining an upper boundary (e.g., + about 1% of the about 5-min median), determining a lower boundary (e.g., − about 1% of the about 5-min median), filtering any data points outside the boundaries (e.g., about 90% of the data may fall between the boundaries), and/or if more than 10% of the data is outside boundaries, skipping this step, and/or calculating a rating which may be equal to (Max−Min)/Avg. One operation may include getting a spread value which may be calculated by multiplying the erratic rating by the median. One operation may include producing a true else false condition if the raw values exceed boundaries and/or the erratic rating is invalid.

Figure 17:
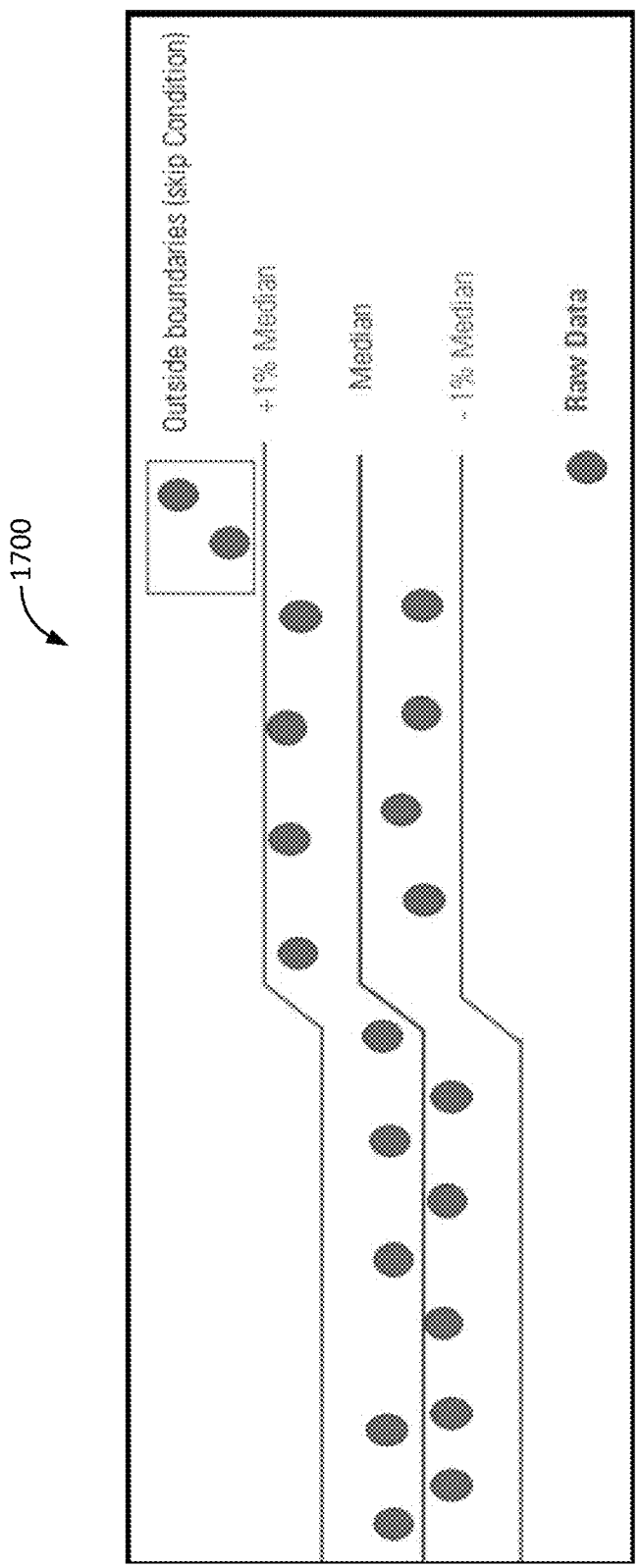
FIG. 17 illustrates example data processing, in accordance with one or more implementations.

FIG. 17 illustrates example data processing, in accordance with one or more implementations. Outside boundaries may skip a condition, and data within 1% of the median may be included in the filtered data.

In some implementations, the gain/loss while drilling monitoring system may include an input value component. The input values, which may include constants and a raw channel, may include calculated TSPM which may be based on one or more of SPM1, SPM2, SPM3 and/or SPM4, average TSPM (e.g., about a 30 sec average), and/or other values. If the TSPM>5, a time index and corresponding value may be stored into memory. In implementations, a circulation elapsed time may be calculated, activity codes may be checked, and the time may be counted if any of the activity codes have circulation codes in them. Where the TSPM>5, the current average may be compared with a previous average and the data point may be reset if a difference between averages is greater than or equal to a threshold.

In implementations, the gain/loss while drilling monitoring system may include a conditional flags component. The conditional flags component may include counting elapsed time if the rig activity code is equal to drilling and/or slide drilling. The conditional flags component may include stopping the counting time when all data points of the rig activity code within a period of time (about 30 secs) are not equal to drilling and/or slide drilling. The conditional flags component may include setting a drilling flag equal to true when the drilling elapsed time may be greater than about 1 min and/or the circulation elapsed time may be greater than about 5 min. The conditional flags component may include saving the time index to memory when the drilling flag may equal true. This condition may be used to prevent the lookback window from looking past the drilling time index.

Figure 18:
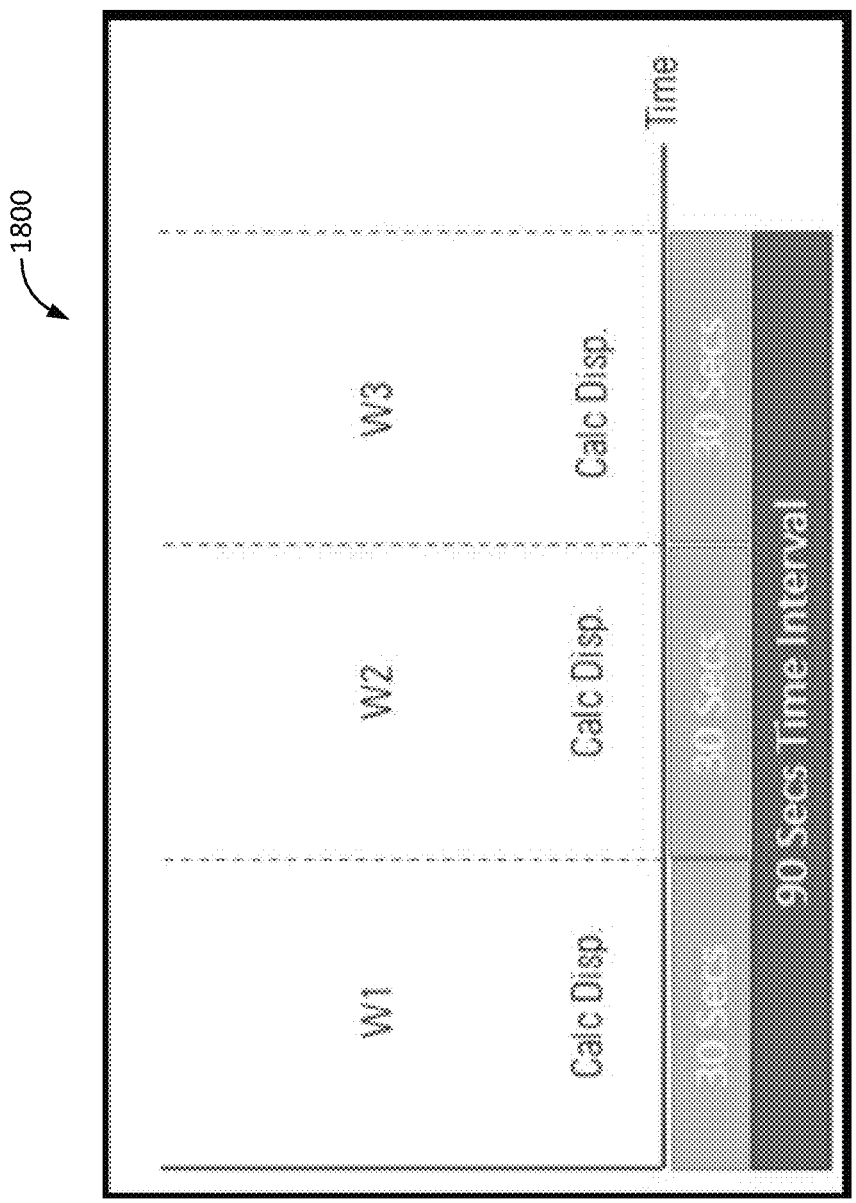
FIG. 18 illustrates an example lookback window, in accordance with one or more implementations.

In implementations, the gain/loss while drilling monitoring system may include a lookback windows component. The lookback window may be growing based on W1, W2, and W3, and it may become a rolling window when W1+W2+W3=about 90 sec. FIG. 18 illustrates an example lookback window, in accordance with one or more implementations. Each lookback window may span a period of about 30 seconds.

Figure 19:
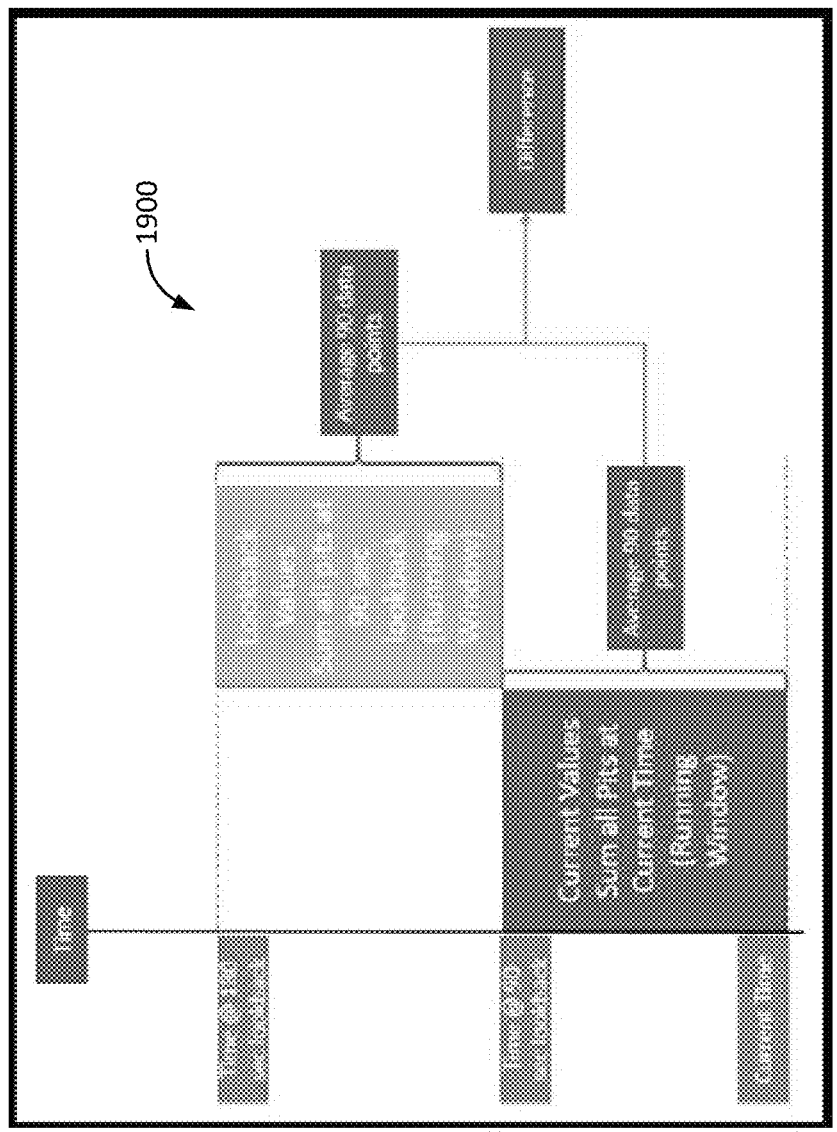
FIG. 19 illustrates an example flowchart for pits processing, in accordance with one or more implementations.

In implementations, the gain/loss while drilling monitoring system may include a pits processing component. FIG. 19 illustrates an example flowchart for pits processing, in accordance with one or more implementations. The pits processing component may include one or more operations. One operation may include identifying a latest time index for each pit and a look back time index at about 90 sec previously. A pit may be a large tank including about 500 bbls or more. One operation may include calculating the current total pits by summing all the pits values at the latest time index. One operation may include calculating the lookback total pits by summing all the pits values at the look back time index. One operation may include calculating about a 90 sec average for the current total pits and the lookback total pits. One operation may include calculating the difference between the current total pits and the lookback total pits.

In some implementations, the gain/loss while drilling monitoring system may include a depth values component. The depth values component may include one or more operations. One operation may include getting the current bit depth, the lag depth, the lookback window bit depth, and/or other depths. A operation may include checking for depth adjustments. Checking for depth adjustments may be determined by current lag depth−lookback lag depth>about 50. If it is greater than about 50, the lag depth adjustment may be flagged. In implementations, cumulative values may be reset. Checking for depth adjustments may be determined by current bit depth−lookback bit depth>about 50. If the value is greater than about 50, the bit depth adjustment may be flagged. In some implementations, the cumulative values may be reset.

Figure 20:
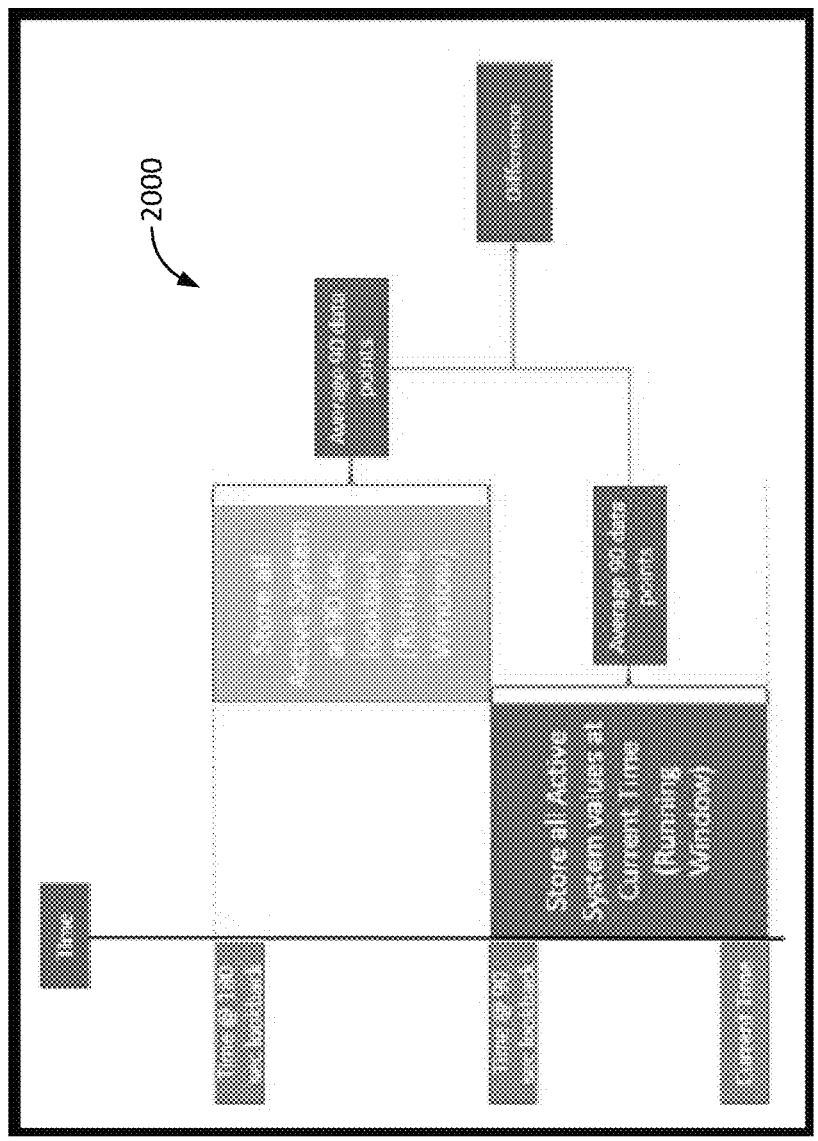
FIG. 20 illustrates an example flowchart for active system data processing, in accordance with one or more implementations.

In implementations, the gain/loss while drilling monitoring system may include an active system data processing component. FIG. 20 illustrates an example flowchart for active system data processing, in accordance with one or more implementations. The active system data processing component may include one or more operations. One operation may include identifying a latest time index for the active system and the look back time index at about 90 sec. One operation may include storing all active system values within about 90 secs from the current time in memory. One operation may include storing all active system values with about 90 secs from the lookback window in memory. One operation may include calculating about 90 sec average for the current active system and the lookback active system. One operation may include calculating the difference between the current active system and the lookback active system.

Figure 21:
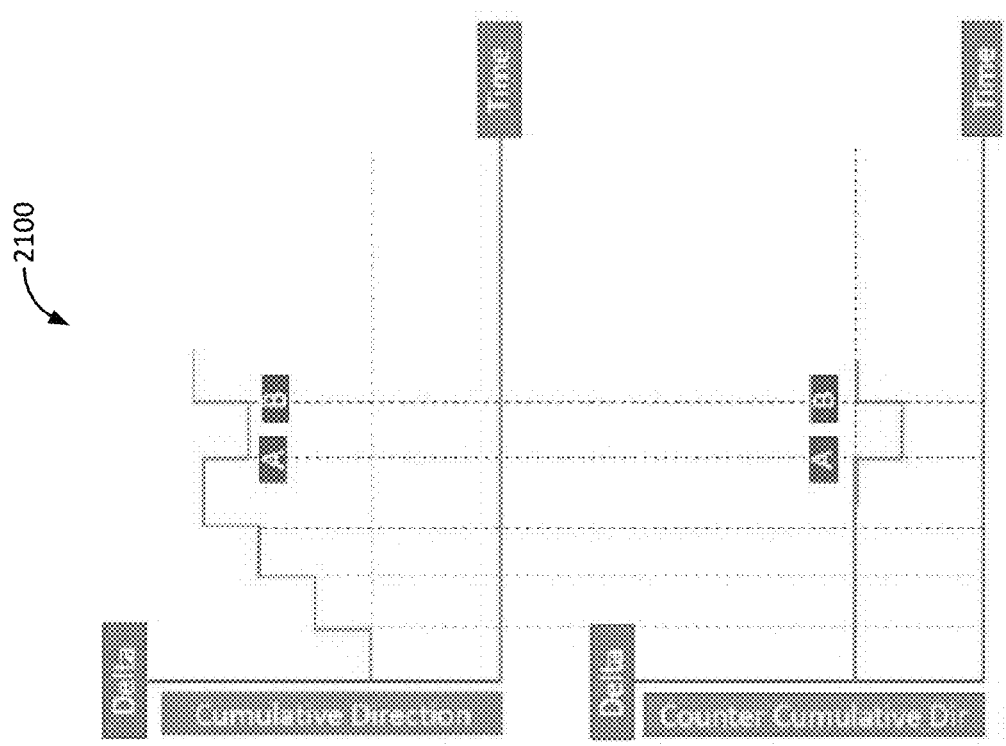
FIG. 21 illustrates pit trend data, in accordance with one or more implementations.

In some implementations, the gain/loss while drilling monitoring system may include a pit trend direction component. The pit trend direction component may include one or more operations. One operation may include identifying one or more threshold values. The pit trend direction component may be based on one or more threshold values corresponding to the trend direction, such as, for example, cumulative direction maximum=about 5, direction threshold=about 2.5, counter direction threshold=about 5, change threshold=about 0.25, and filter threshold=about 10. In some implementations, the trend may be based on the last 4 values of the about 90-sec average window. One operation may include cycling through the list of values and determining if the values are valid (not null) and track the time of each value. A operation may include setting new data points equal to the previous ones when the change rate may be higher than the filter threshold between current data points and the last data points in the list. One operation may include finding delta values and delta time values between a first data point and a second data point, a second data point and a third data point, and a third data point and a fourth data point. One operation may include tracking a cumulative value by summing the deltas. The sum may not increase/decrease past the cumulative max direction. One operation may include keeping a counter cumulative direction at 0 if there is no change in direction. If a change is detected then the change may be added. When the threshold is reached, the cumulative direction may be reset to match the new value of the counter cumulative direction. One operation may include reducing the cumulative direction value by about 25% if current value−avg value<change threshold. One operation may include flagging an increase in direction when the data point>direction threshold. One operation may include flagging a decrease in direction when the data points<direction threshold. FIG. 21 illustrates pit trend data, in accordance with one or more implementations.

In some implementations, the gain/loss while drilling monitoring system may include a hole displacement component. The hole displacement component may include one or more operations. One operation may include checking the validity of a lag depth, a bit depth, an active system, and total pits. A value may be valid if it is greater than 0. One operation may include calculating the displacement for the active system and total pits. This may be based on the active system, total pits, total pits about 180 secs prior, lag depth, lag depth about 180 secs prior, hole size, bit depth, and/or DP displacement. For example, the calculation may be (Active System/Total Pits−Active System/Total Pits (about 180 secs ago))−((Lag Depth−Lag Depth (about 180 secs ago))*−((Hole Size^2)/1029.4)+(Bit Depth−Bit Depth (about 180 sec ago)*DP Displacement)

In some implementations, the gain/loss while drilling monitoring system may include a hole displacement value check component. The hole displacement component may include one or more operations. One operation may include checking the difference between a current value and a previous value. If the difference is less than about 20 bbl then additional operations may be performed. If the difference is greater than about 20 bbl the previous value may be replaced with the current one. A operation may include checking the time index difference between the current value and the previous value. If the difference is greater than about 60 secs, all the data points of hole displacement may be cleared from memory. If the difference is greater than about 5 min, the cumulative values may be reset. One operation may include adding a hole displacement to the memory list if previous checks passed.

In some implementations, the gain/loss while drilling monitoring system may include a values versus thresholds component. The values versus thresholds component may include one or more operations. One operation may include checking all the data values for hole displacement within about 60 sec and count a total number of data points and a number of data points greater than or equal to about 1.5 bbl. One operation may include checking all the data values for the hole displacement within about 90 secs (W2) and counting a total number of data points, a number of data points greater than about 5 bbl, and a number of data points less than about −10 bbl. One operation may include checking all the data values for the hole displacement within about 180 secs (W1 & W2) and counting a total number of data points and a number of values below about −5 bbl.

In some implementations, the gain/loss while drilling monitoring system may include a cumulative gain/loss component. The cumulative gain/loss component may include one or more operations. One operation may include updating a reset time to a current time if any of the reset flags=True. One operation may include checking the circulation time and the reset time and determining which one is greater. Both times may have a maximum cap of about 20 min. One operation may relate to active systems falling inside boundaries, as described above. One operation may include storing all the active system values in memory when the circulation elapsed time is greater than about 10 min and the reset time is less than about 20 min. If the reset occurs, all the data from memory that is older than the current time may be removed. One operation may include checking if there are at least about 10 min of data in memory. One operation may include running a linear regression. One operation may include calculating a Slope*Time Range. One operation may include calculating the difference between current values for a bit depth and a lag depth and the bit depth and the lag depth values at the beginning of this time window. One operation may include calculating the hole displacement, as described above. One operation may include storing the values in memory. One operation may include cleaning up all the cumulative hole displacement in memory list if drilling flag=False. One operation may include cleaning up data points greater than about 15 mins for cumulative hole displacement. One operation may include cleaning up data points of cumulative hole displacement for any data point that is greater than about 120 secs.

In some implementations, the gain/loss while drilling monitoring system may include a generate alert codes component.

For one example drilling alert code, an alert may be generated if one or more conditions are met. One condition may be (Number of data points within about 60 secs above 1.5 bbl)/Total number of points within about 60 secs is greater than or equal to about 95%. One condition may be that the circulation elapsed time is greater than about 5 min. One condition may be that any value of the active system is outside the active system processing boundaries, as described above. One condition may be that the active system boundaries increased (i) is True and/or (iii) is False. This condition may ensure the gain/loss while drilling monitoring system may capture the increase in displacement while the active system fluctuation increases.

For one example drilling alert code, an alert may be generated if one or more conditions are met. One condition may include (Number of data points within about 60 secs above about 1.5 bbl)/Total number of points within about 60 secs greater than or equal to about 95%. One condition may be that the circulation elapsed time is greater than about 5 min. One condition may be that any value of the active system is outside the active system processing boundaries, as described above. One condition may be active system values decreased by at least about 5 bbl, as described above. One condition may be Hole Displacement (B (Current−90 secs)−C (Current−180 secs))<about −10 bbl. One condition may be Hole Displacement (A (Current)−B (Current−90 secs))>Hole Displacement ((B−C)/2). A may correspond to a current time, B may correspond to the current time minus about ninety seconds, and C may correspond to the current time minus about 180 seconds.

For one example drilling alert code, an alert may be generated if one or more conditions are met. One condition may be that one or more alert codes have already been generated. One condition may be (Number of data points within about 90 secs above about 5 bbl)/Total number of points within about 90 secs greater than or equal to about 95%. One condition may be Hole Displacement (B−C) >=about 5 bbl. One condition may be Hole Displacement (A−B)>(B−C)*2.

For one example drilling alert code, an alert may be generated if one or more conditions are met. One condition may be determining whether 95% of data points within about 90 secs in the hole displacement is greater than or equal to about 1.5 bbl.

For one example drilling alert code, an alert may be generated if one or more conditions are met. One condition may be that about 95% of hole displacement values between B and C are greater than or equal to about −10 bbl. One condition may include (hole displacement values for B–hole displacement values for C)≥−10 bbl. One condition may include (hole displacement values for A–hole displacement values for B)>(hole displacement values for B–hole displacement values for C)/2.

For one example drilling alert code, an alert may be generated if one or more conditions are met. One condition may be that about 95% of hole displacement values between B and C are greater than or equal to about 5 bbl. One condition may include (hole displacement values for B–hole displacement values for C) 5 bbl. One condition may include (hole displacement values for A–hole displacement values for B)>(hole displacement values for B–hole displacement values for C)*2. One condition may include that one or more of the alert codes may have been generated.

For one example loss alert code, an alert may be generated if one or more conditions are met. One condition may be (Number of data points within about 180 secs below–about 5 bbl)/Total number of points within about 180 secs greater than or equal to about 95%. One condition may be that the circulation elapsed time is greater than about 15 min.

For one example cumulative alert code, an alert may be generated if one or more conditions are met. One condition may be (Number of data points within about 60 secs above about 1.5 bbl)/Total number of points within about 60 secs greater than or equal to about 95%. One condition may be (Number of data points within about 120 secs above about 1 bbl)/Total number of points within about 120 secs greater than or equal to about 95%. One condition may be (Number of data points within about 60 secs above about 0 bbl)/Total number of points within about 60 secs greater than or equal to about 95%. One condition may be (Number of data points within about 120 secs above about 0 bbl)/Total number of points within about 60 secs greater than or equal to about 95%.

One example cumulative alert code may be generated if one or more conditions are met. One condition may be whether about 95% of data points of the cumulative hole displacement are greater than or equal to about 1.5 bbl over about 60 secs. One condition may be whether about 95% of the data points of the cumulative hole displacement are greater than or equal to about 1.0 bbl over about 110 secs.

For one average alert code, an alert may be generated if one or more conditions are met. One condition may be getting about a 15 min average for the hole displacement. The average may be added to the memory (about a 60 sec rolling window). One condition may be (Number of data points within about 60 secs above about 1 bbl)/Total number of points within about 60 secs greater than or equal to about 95%.

For one example average loss alert code, an alert may be generated if one or more conditions are met. One condition may be getting about a 15 min average for the hole displacement. The average may be added to the memory (about 60 sec rolling window) One condition may be (Number of data points within about 60 secs less than −1 bbl)/Total number of points within about 60 secs greater than or equal to about 95%.

An example drilling loss alert code may be generated if about 95% of the calculated hole displacement values are less than or equal to about −5.0 bbl over about 90 sec.

An example average drilling alert code may be generated if about 95% of the calculated average hole displacement values (using about a 15 min average) are greater than or equal to about 1 bbl over about 60 secs.

An example average drilling loss alert code may be generated if about 95% of the calculated average hole displacement values (using about a 15 min average) are less than or equal to about −5 bbl over about 60 secs.

In implementations, the gain/loss while drilling monitoring system may include a keep alive condition component. The keep alive condition component may include one or more operations. One operation may include holding a value for about 60 seconds when an alert code is greater than 0. This cool down window may be used by other monitoring systems, so the alarm may stay visually active for at least about 60 secs after the condition clears.

Figure 24:
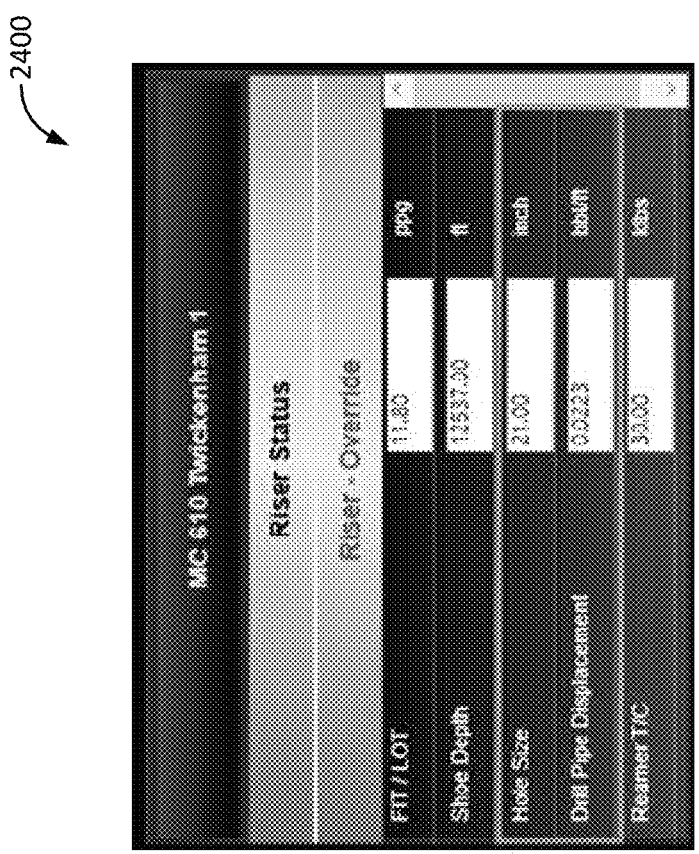
FIG. 24 illustrates an example user input control panel, in accordance with one or more implementations.

The gain/loss while drilling monitoring system may allow a user to setup constants by using a graphical user interface having a control panel display. FIG. 24 illustrates an example user input control panel, in accordance with one or more implementations. The constants may include, for example, fit/lot, shoe depth, hole size, DP displacement, Reamer T/C, and/or other constants. The constants may be setup at the beginning of the hole section and/or prior to drilling. In some implementations, the hole size may be the bit OD if there is no reamer in place. In implementations where a reamer is activated, the max OD may be used for the reamer. A constant may include a drill pipe displacement, which may be the steal displacement for the pipe added to the well while drilling. The gain/loss while drilling monitoring system may be updated from that time, and the gain/loss while drilling monitoring system may use the new constants to calculate the hole displacement while drilling. In implementations, the constants may be used during drilling operations.

The gain/loss while drilling monitoring system may output data, alerts, etc., as described above. This may include the drilling alert codes, the cumulative alert codes, the drilling loss alert codes, the average alert codes, the loss alert codes, the average loss alert codes, the average drilling alert codes, and/or the average drilling loss alert codes. In implementations, the remote monitoring system may include filtered hole displacement values that may be used for real-time monitoring purpose; outputs for the cumulative displacement over a period of time; a channel produced by the depth index for the displacement calculations over a number of stands; an instantaneous hole displacement for the active system; an instantaneous hole displacement for the total pits; a hole displacement comparison over a number of stands; a time counter for TSPM>5, and/or other data.

Figure 22:
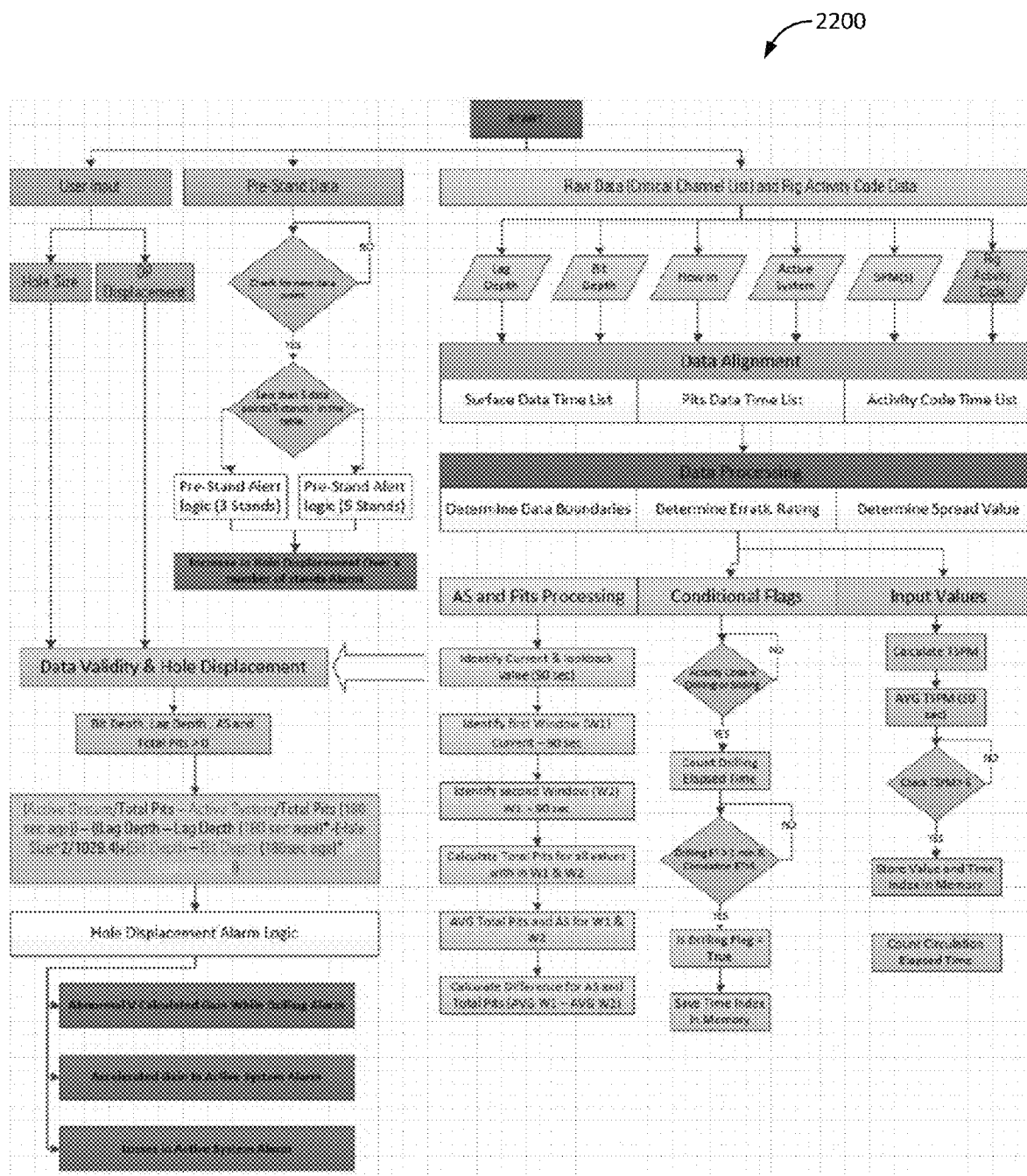
FIG. 22 illustrates an example flowchart for a gain/loss while drilling monitoring system, in accordance with one or more implementations.

FIG. 22 illustrates an example flowchart for the gain/loss while drilling monitoring system, in accordance with one or more implementations. The details of this flowchart are described above. The gain/loss while drilling monitoring system may use user input, pre-stand data, raw data, and rig activity code data. The user input may include hole size and DP displacement. The pre-stand data may be checked for new data points. The raw data and rig activity code data may include a lag depth, a bit depth, a flow in, an active system, a SPM, and a rig activity code. The data may be aligned using a surface data time list, a pits data time list, and an activity code time list. The data may be processed by determining data boundaries, determining erratic rating, and determining spread value. The data may be passed to the conditional flags component and input values component, as described above. The AS and pits processing component may be output to the data validity and hole displacement taken from the user input component. The bit depth, log depth, AS, and total pits may be greater than 0. The data may be passed through an algorithm to the hole displacement alarm logic, which may include abnormal versus calculated gain while drilling, accelerated gain in active system, and/or losses in active system.

Figure 23:
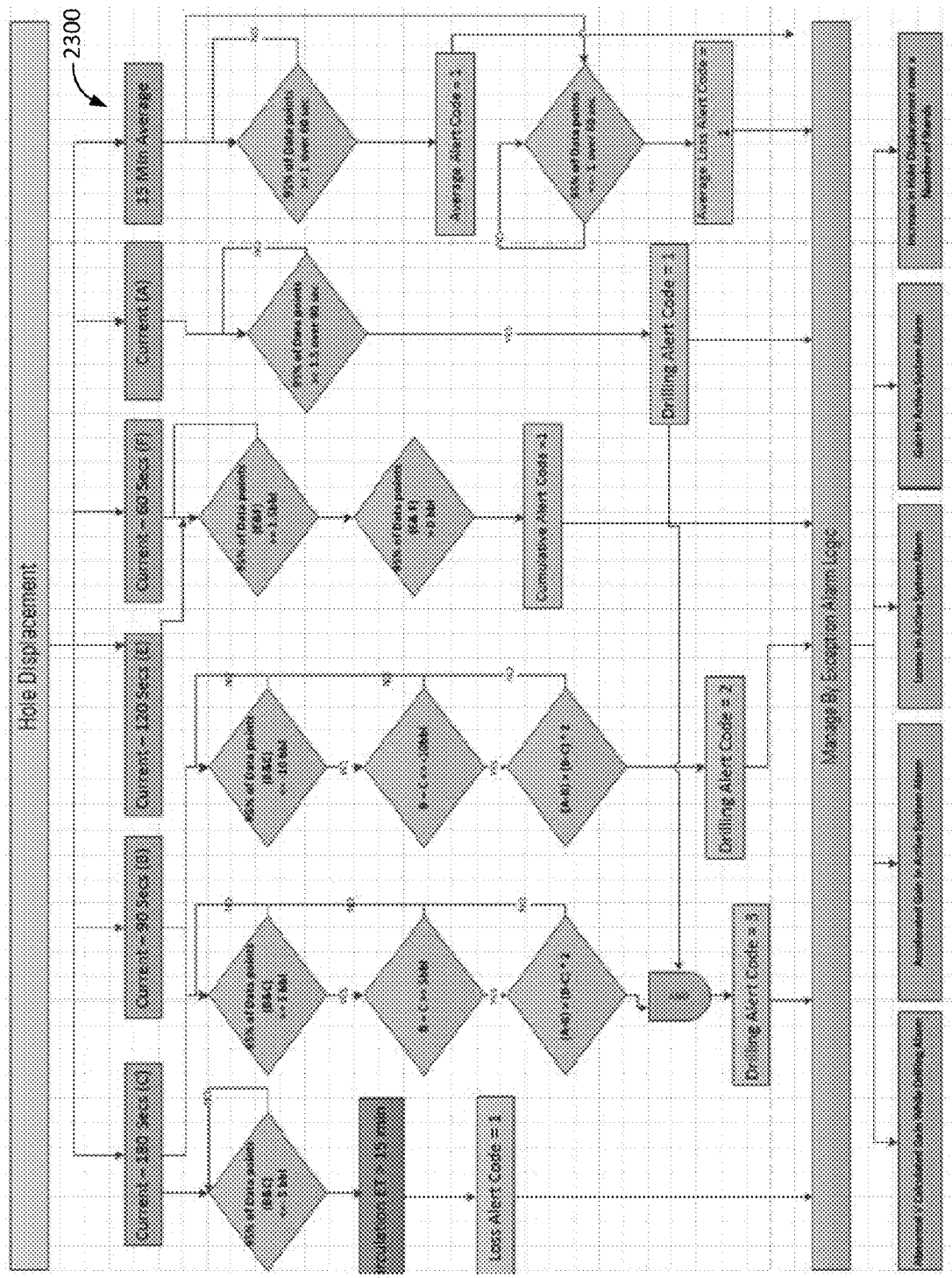
FIG. 23 illustrates alert code for gain/loss while drilling monitoring, in accordance with one or more implementations.

FIG. 23 illustrates alert code for gain/loss while drilling monitoring, in accordance with one or more implementations. Various alert codes, as described above are presented in flowchart format. The generated alarms may be passed to the hole displacement alarm logic, or manage by exception alarm logic, as described herein.

In implementations, an example monitoring system may include a gain in active system while circulating monitoring system. The gain in active system while circulating monitoring system may be configured to capture any gain/loss in the active system while circulating and/or boosting the riser. The monitoring system may be based on changing flow rates, reaming, and/or transfer fluid from/to the active system. A riser may a pipe or other coupling device that couples an offshore production structure to a subsurface reservoir for drilling, production, etc.

The gain in active system while circulating monitoring system may include mud flow in, SPM (x), active system, and/or bit depth as raw data inputs. Bit direction may be calculated as an input for the gain in active system while circulating monitoring system.

The gain in active system while circulating monitoring system may include a data alignment component, which is described above. The gain in active system while circulating monitoring system may include a data validity check component, which may check that all input data channels have values for the last about 60 secs. This may reduce false alarms when there are gaps in the real-time channels.

The gain in active system while circulating monitoring system may include a TSPM calculation component. The TSPM calculation component may sum all the raw SPM(s) data.

Figure 25:
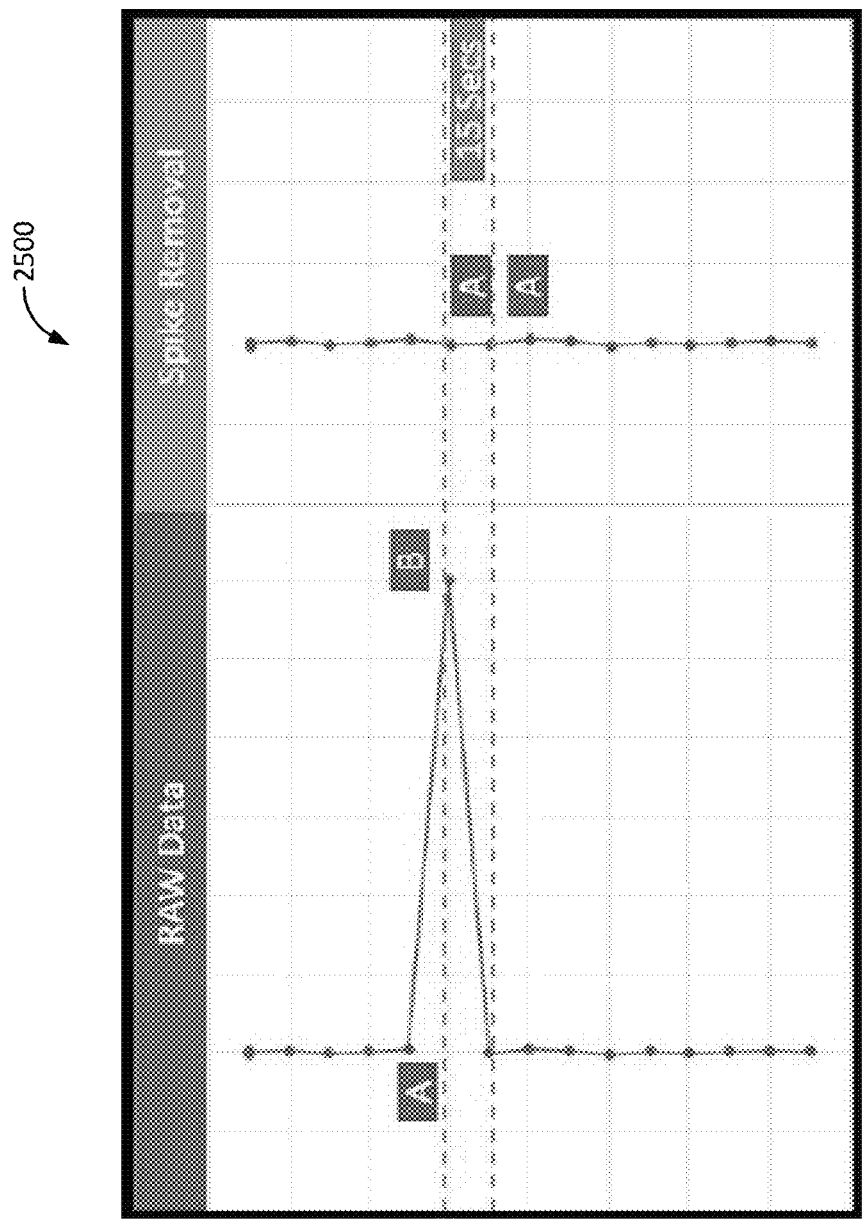
FIG. 25 illustrates an example data spike.
Figure 26:
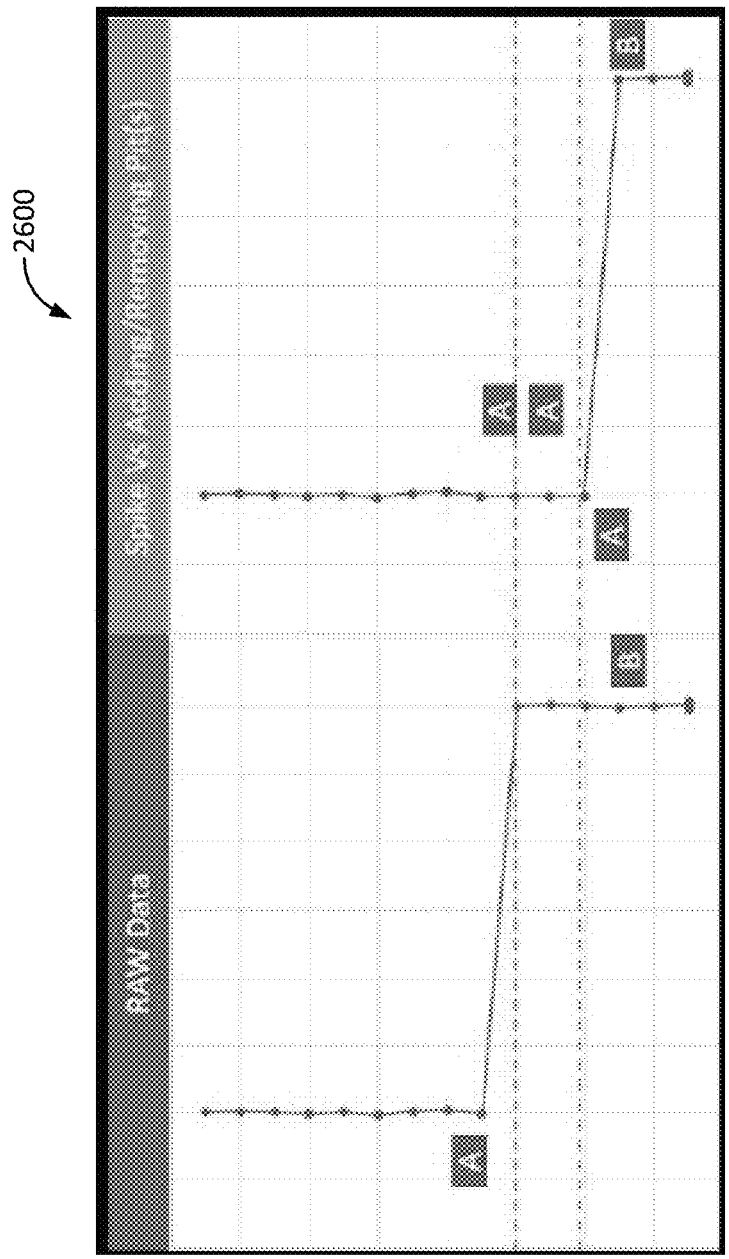
FIG. 26 illustrates adding/removing pits to an active system.

The gain in active system while circulating monitoring system may include an active system spike check component. FIG. 25 illustrates an example data spike. FIG. 26 illustrates adding/removing pits to an active system. The active system spike check component may include one or more operations. One operation may include calculating a difference between a current value and a previous value. One operation may include generating possible spike flags when the difference between the current value and the previous value is greater than about 15 bbl. One operation may include storing both current and previous values in the memory. One operation may include using the previous data points (prior to the flag being generated) instead of the current ones for the first 15 secs after the possible spike flag may be generated. One operation may include using the current values instead of previous values if the possible spike flag was generated more than 15 secs ago and a difference between the current value and the previous values is less than about 6 bbl; when the current values are used instead of the previous values, clear the memory and stop the possible spike flag. One operation may include storing the current values in the memory.

The gain in active system while circulating monitoring system may include a process active system component. The process active system component may include one or more operations. One operation may include taking an active system value (after spike check) and adding it to a list in the memory that is about 30 seconds long. One operation may include (0.10*most recent value+0.90)*(average of the remaining active system values in list). This may allow the function to react faster than the regular average by giving more weight to a current value.

One operation may include adding the processed values into the pit container list in the memory. One operation may include calculating about a 30 sec average of the active system processed data. One operation may include initializing dynamic SPM thresholds and an alert history.

The gain in active system while circulating monitoring system may include a pumps on/off flag component. The pumps on/off flag component may include one or more operations. One operation may include determining whether a pump on flag is active. A pump on flag may be active if TSPM greater than about 5 and mud flow in is greater than about 10 USgal/min. Mud flow may be calculated based on the rig pumps pumping inside the string (during normal operations). The pump on flag may check a pumps off elapsed time by comparing the current time to the last pump off time index. The pump on flag may generate a pump off flag if the pump off elapsed time is less than about 60 sec. The pump on flag may set an initial magic point for the active system, which may be based on an average of processed active system values. The magic point may be a start point of a trend that the monitoring system will start to monitor. It should be appreciated that the magic point may change dynamically, as is described herein.

One operation may include determining whether a pump off flag is active. The pump off flag may clear memory and the magic point. The pump off flag may save a pumps off time index in memory. The pump off flag may reset dynamic pump cool down window to about 60 secs. The pump off flag may check for a returns flag and wait for a pumps on flag. Checking for a returns flag and waiting for a pumps on flag may include checking a trendline (e.g., linear regressive line) to see if the active system gained about 3 or more bbl over the last about 30 seconds. If the active system gained about 3 or more bbl over the last about 30 second, flowback may not have stabilized. If the active system has not gained about 3 or more bbl over the last about 30 second, check if the pumps have been on for at least about 3 minutes and the trendline indicates less than about 3 bbl gain. Checking for a returns flag and waiting for a pumps on flag may include stopping the check for returns flag. Checking for a returns flag and waiting for a pumps on flag may include setting a flowback stabilized flag and setting a magic point to a current processed active pit value.

The gain in active system while circulating monitoring system may include a monitor TSPM component. The monitor TSPM component may include one or more operations. One operation may include initializing the bookmark value for TSPM (e.g., a current TSPM value). One operation may include comparing the current TSPM value against the bookmarked value and determining if the difference is >about 10 or <about −10. One operation may include checking for downlinking if a deviation in the TSPM is detected. One operation may include clearing data from the memory, setting the active system unstable flag to true, and/or setting the pump direction flag to −1, if a decrease in TSPM is detected. If an increase in TSPM is detected, clear the data from the memory, set the active system unstable flag to True, and set the pump direction flag to 1.

The gain in active system while circulating monitoring system may include a dynamic cool down check component. The dynamic cool down check component may include one or more operations. One operation may include checking whether recent alerts have been received, whether the active system flag is stable, and/or whether pumps have been on for longer than a dynamic cooldown time (e.g., about 60 seconds). One operation may include increasing the dynamic cooldown time by about 30 seconds if the active system has increased by more than 3 bbl in the last about 60 seconds. One operation may include setting the current bookmark TSPM as the current TSPM.

The gain in active system while circulating monitoring system may include a manage pump cool down component. The manage pump cool down component may include one or more operations. One operation may include determining whether recent alerts have been received and whether the current time has surpassed the bookmarked TSPM. One operation may include resetting the pump direction flags, setting a magic point to the current active system, setting the boosting magic point to the current active system, and/or resetting the dynamic cooldown to default (e.g., about 60 secs) when more than about 2 minutes and 30 seconds have been added to the default cooldown time and/or whether the active system has gained less than about 3 bbl in the last about 60 seconds. If one or more of these conditions do not occur, the dynamic cooldown may increase by about 30 seconds.

The gain in active system while circulating monitoring system may include a pipe direction change component.

Figure 27:
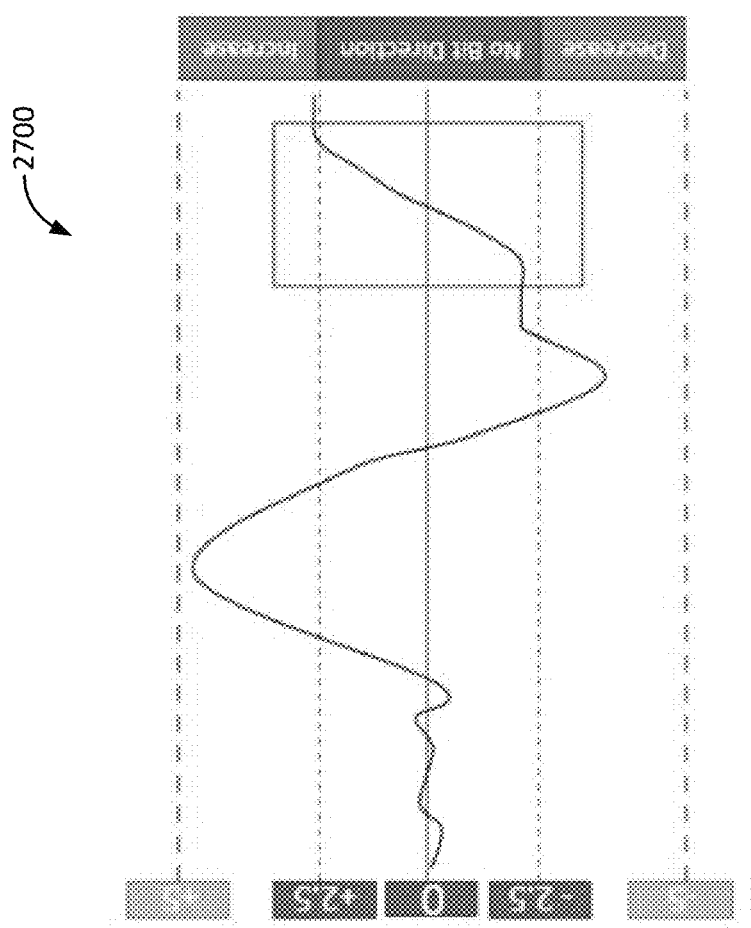
FIG. 27 illustrates example pipe direction change.

FIG. 27 illustrates example pipe direction change. The pipe direction change component may include one or more operations. One operation may include using a bit direction from the rig activity. One operation may include determining if a direction has changed based on whether the previous bit direction was about 2.5 and the current direction is greater than about 2.5. One operation may include tracking a cumulative delta for bit-depth over the last 20 seconds. If cumulative deltas are greater than about 5 feet, the cumulative delta may be marked as "moved fast". One operation may include resetting any pipe direction flags and/or setting a magic point to the about 30 sec average of processed active system values if the pipe direction "moved fast" and/or more than 60 seconds have elapsed since the last direction change was detected.

The gain in active system while circulating monitoring system may include a loss reset component. The loss reset component may include one or more operations. One operation may include determining whether the magic point is greater than the current processed active system by 2.4 bbl (0.8*pit change threshold). One operation may include setting the magic point to the about 30 second average of the processed active system values.

The gain in active system while circulating monitoring system may include a short pump off reset component. The short pump off reset component may reset the short pump off and set the magic point to about a 30 second average of processed active system values when the pumps have been off for about 60 seconds and the short pump off phase is still active.

The gain in active system while circulating monitoring system may include a booster check component. The booster check component may include one or more operations. One operation may include setting the boosting magic point to about a 30 sec average of the processed active system values when the TSPM is greater than about 5, the flow in is less than about 10, and/or whether the pumps have not changed recently and boosting magic points has not been previously been searched for. Otherwise, if the active pit becomes about 2.4 bbl less than the boosting magic point, the boosting magic point may be set to about a 30 sec average of the processed active system values.

The gain in active system while circulating monitoring system may include a stable check component. The stable check component may include one or more operations. One operation may include determining a stable flow. The stable flow may be based on about 60 sec medians with +/−5 US gal/min of flow in borders. Determining a stable flow may include checking a percent of values inside the border. If about 90% of the values are inside the border, then the flow may be marked as stable.

One operation may include determining a stable active system. The stable active system may be based on a permissible pit change of about 3 bbl/about 60 secs. The stable active system may include getting about a 60 second trendline for the processed active pits. The trendline may be between about −0.025 and about 0.025 bbl for an active system to be considered stable. The stable active system may include flagging the active system as stable and setting the magic point to current processed active system data when the flow and the active system are stable.

The gain in active system while circulating monitoring system may include a final check component. The final check component may include one or more operations. One operation may include determining whether the bit has not moved fast and/or the pipe direction has not changed recently. One operation may include determining whether the pump rate has not changed recently, the active system is unstable, and/or flowback is stable. One operation may include determining whether the pumps have been on longer than the dynamic cooldown time. One operation may include identifying a magic point. One operation may include identifying that at least 60 seconds are in the processed active system container. If one or more of the above operations for the final check component are found true, alerts may be checked.

The gain in active system while circulating monitoring system may include a generate alert codes component. The generate alert codes component may include one or more operations. One operation may be determining whether rig activity is pumps on activity. Determining whether rig activity is pumps on activity may include determining a drilling operation. The drilling operation may include checking a propagation trend of the active system against any magic points. The drilling operation may include setting the value propagation value to 1 when about 90% of the processed active pit is greater than the magic point+3 bbl. The drilling operation may include setting the value propagation value to 2 when about 90% of the processed active pit is less than the magic point−3 bbl. The drilling operation may include resetting the magic point to the about 30 second average of processed active system points when the propagation value is 1.

Determining whether rig activity is pumps on activity may include determining a circulation operation. The circulation operation may include checking for an active system stable flag. The circulation operation may include setting the "collectGainData" to false, when the current processed active system value is greater than the magic point+3 bbl. The circulation operation may include setting the value propagation value to 1 if about 90% of the processed active pits are greater than the magic point+3 bbl and there have been no previous alerts.

The circulation operation may include generating alert code 1 and flagging "collectGainData" to true if the propagation value is 1; otherwise, if previously alerted, keeping the alert code value as 1. The circulation operation may include determining whether the alert code is 1 or more than 3 minutes have elapsed since the last alert. The circulation operation may include grabbing the last about 30 seconds of the processed active system data and placing it into a gain container when "collectGainData" is flagged; otherwise, the current processed active system value may be added to the gain container. The circulation operation may include getting a trendline for a first 60 seconds of gain (A) versus the most recent 60 seconds of gain (B) when at least 120 seconds worth of data is in the gain container, A*amount of data points in A>5, and B amount of data points in B>0. If B>A*2 then generating alert code 2. The circulation operation may include clearing the gain container when the alert code is not 1, and it has been more than about 3 minutes since the last alert.

The circulation operation may include determining whether the active system is not stable. The circulation operation may include identifying a magic point when no short pumps off phase has occurred, the SPM has not decreased, and/or the processed active system>magic point+3 bbl. The circulation operation may include checking the propagation for the active system when the system has not been alerted recently. The circulation operation may include setting the value propagation value to 1 when about 90% of the processed active pit is greater than the magic point+3 bbl. The circulation operation may include setting the value propagation value to 2 when about 90% of the processed active pit is less than the magic point−3 bbl. The circulation operation may include generating alert code 3 when the propagation value is 1. The circulation operation may include persist the alert code 3 if recently alerted.

The circulation operation may include determining when the pumps are on and the pipe is moving down. Determining when the pumps are on and the pipe is moving down may include getting cumulative delta values for bit depth for the last about 60 seconds and determining the displacement value (bit distance*displacement threshold). Determining when the pumps are on and the pipe is moving down may include determining whether the processed active pit value is greater than the magic point+5 bbl+the displacement value. Determining when the pumps are on and the pipe is moving down may include getting the pit propagation value if not alerted previously. Determining when the pumps are on and the pipe is moving down may include generating alert code 4 if the propagation value is 1 and the pumps have not increased or decreased.

The circulation operation may include determining when pumps are on and the pipe is moving up and generating alert code 5.

Determining whether rig activity is pumps on activity may include determining a boosting operation. The boosting operation may include determining whether the processed active pit value is greater than boosting magic point+3 bbl. The boosting operation may include getting the pit propagation value if not alerted previously. The boosting operation may include generating alert code 6 if the propagation value is 1 and the pumps have not increased or decreased.

The gain in active system while circulating monitoring system may include an alert keep alive logic component, as described in greater detail above.

The gain in active system while circulating monitoring system may include an alert suppression component. The alert suppression component may include ignoring an alert code if a valid alert code is received within about 3 minutes of a previous alert code. The alert suppression component may include determining whether a persistent alert code has been received for more than about 10 seconds. The alert suppression component may include extrapolating about 3 barrels/about 60 seconds to about 1 hour=>about 180 bbl. The alert suppression component may include getting a linear trend for the processed active system points for about 60 seconds and extrapolating the values to one hour*3600. The alert suppression component may include determining that the pit is stable if the extrapolated one-hour trend is >−36 and <+36. The alert suppression component may include resetting the boosting magic point if stable and boosting; otherwise, the magic point may be reset and alert code 0 may be generated.

The gain in active system while circulating monitoring may include circulation alert code, a time index, and/or other data as outputs, as described above.

Figure 28:
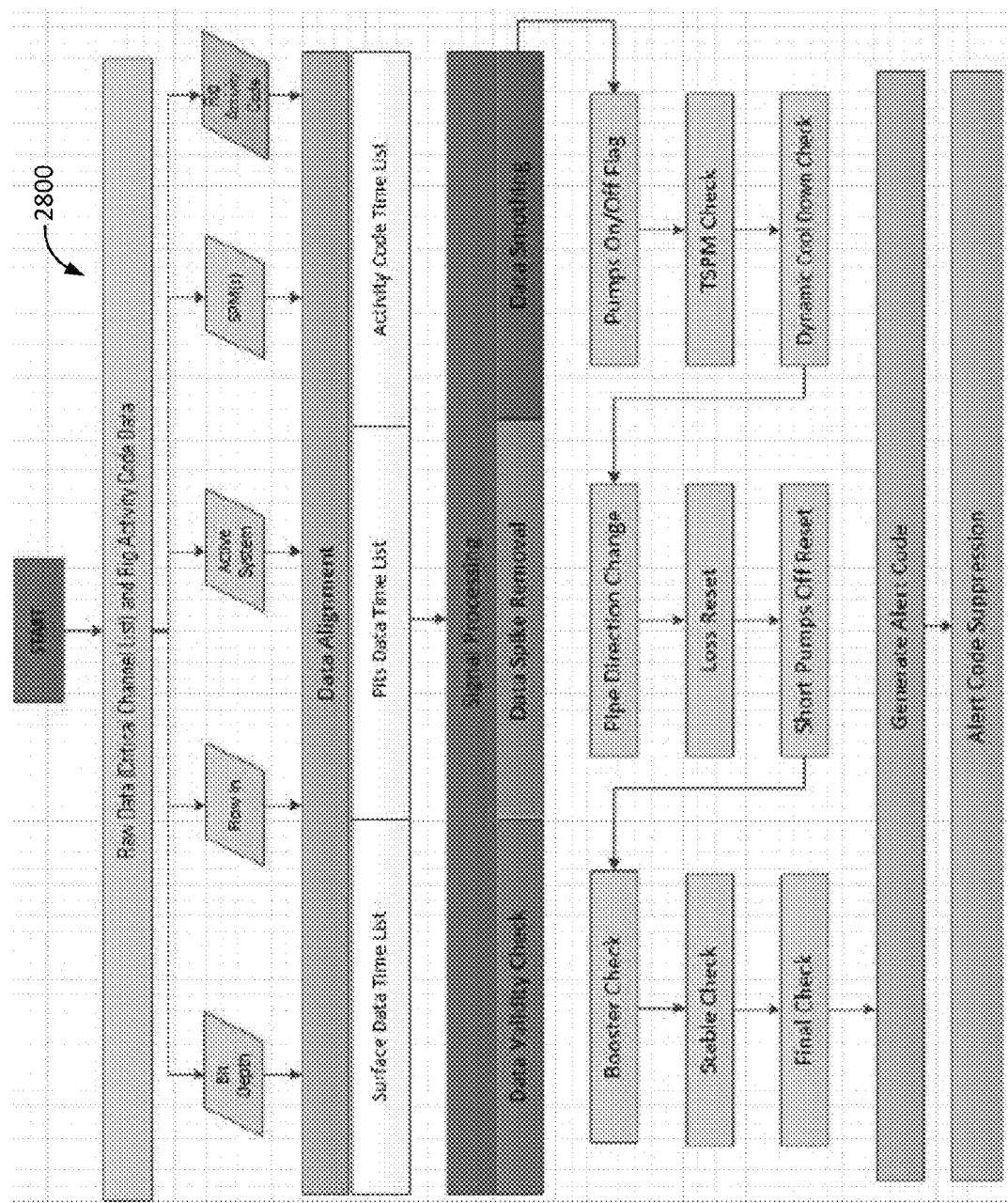
FIG. 28 illustrates an example flowchart for a gain/loss while circulating monitoring system, in accordance with one or more implementations.

FIG. 28 illustrates an example flowchart for a gain/loss while circulating monitoring system, in accordance with one or more implementations. The example flowchart may be described in greater detail above. Raw data and rig activity code data may be used as inputs, which may include, bit depth, flow in, active system, SPM, and rig activity code. These may be subject to data alignment based on the surface data time list, the pits data time list, and the activity code time list. These may be further processed through a data validity check, a data spike removal, and data smoothing. The data may be further processed through a number of components, such as, the pumps on/off flag component, the TSPM check component, the dynamic cool down check component, the pipe direction change component, the loss reset component, the short pumps off reset component, the booster check component, the stable check component, the final check component, the generate alert code component, and the alert code suppression component.

In implementations, an example monitoring system may include a per stand monitoring system. The per stand monitoring system may be configured to perform calculations per stand (e.g., average hole displacement per stand and stand pipe pressure average per stand).

The per stand monitoring system may include a data alignment component, as described above.

The per stand monitoring system may include a check rig activity code component. The check rig activity code component may include determining if the activity is equal to in/off slips.

When the activity is equal to in-slips, the previous in-slips status time index may be checked. When the activity is equal to in-slips, the difference between the current hole depth and the hole depth at a previous in-slips status may be checked. When the activity is equal to in-slips, the difference may be greater than about 10′. When the activity is equal to in-slips, an in-slips current time−previous slips time index>about 10 sec. When the activity is equal to in-slips, the SPP and hole displacement vales may be added to separate lists for the data points that have one or more conditions. One condition may be that the data points are within the last in-slips time index and the time index for the previous in-slips. One condition may be that the circulation time>about 5 min, the Drilling Time (Is Drilling Condition)>about 1 min, the pumps are stable, as described above, and the data has more than about 5 min of the last known transfer to/from active system, as described above. If one or more conditions are met, the averages may be stored in the memory.

When the activity is equal to off-slips, the system may continue looping through the in-slip steps.

The per stand monitoring system may output a table where individual rows may represent data for an individual stand.

In implementations, an example monitoring system may include a value change monitoring system. The value change monitoring system may be configured to track incremental changes and determine if the total change exceeds a threshold value for a period of time. The type of change (e.g., increase or decrease) may be based on how the threshold value is exceeded, as will be described herein.

The value change monitoring system may include one or more inputs. One input may include a value change threshold. The value change threshold may be the value which has to be met/exceeded by a calculated sum in order to produce a value change output of 1 or −1. One input may include an onset window. An onset window may be the time duration for which value change outputs (of 1 or −1) may be maintained to produce value change intermediate outputs. One input may include a given percent of data points. The given percent of data points may be the percentage of data points that meet/exceed the value change threshold within the onset window.

The value change monitoring system may include a calculate the difference component. The calculate the difference component may calculate the difference between consecutive (current−previous) raw values for any channel to which the value change function is applied.

The value change monitoring system may include a calculate the sum of differences component. The calculate the sum of differences component may calculate a running sum of the calculated differences (e.g., current Difference+ previous Difference(s)) and re-zero the sum on the timestamp after the value change marker (Increase/Decrease) is produced.

The value change monitoring system may include a value change marker component. A value change marker may be generated when the sum meets/exceeds the value change threshold. Determining when the sum meets/exceeds the value change threshold may include outputting 1 when a given percent of sum data points are greater than or equal to the value change threshold. Determining when the sum meets/exceeds the value change threshold may include outputting −1 when a given percent of the sum data points are less than or equal to the negative of the value change threshold. Determining when the sum meets/exceeds the value change threshold may include determining when the value change marker (1 or −1) is maintained. Determining when the value change marker (1 or −1) is maintained may include staying at 1 for the value change marker if the value change marker is 1 as long as a given percent of difference data values>0. Determining when the value change marker (1 or −1) is maintained may include staying at −1 for the value change marker if the value change marker is −1, as long as a given percent of difference data values<0. Otherwise, the value change marker is set to zero.

Determining when the sum meets/exceeds the value change threshold may include determining the value change marker is set to zero when the sum is between the value change threshold and the negative value change threshold.

Figure 29:
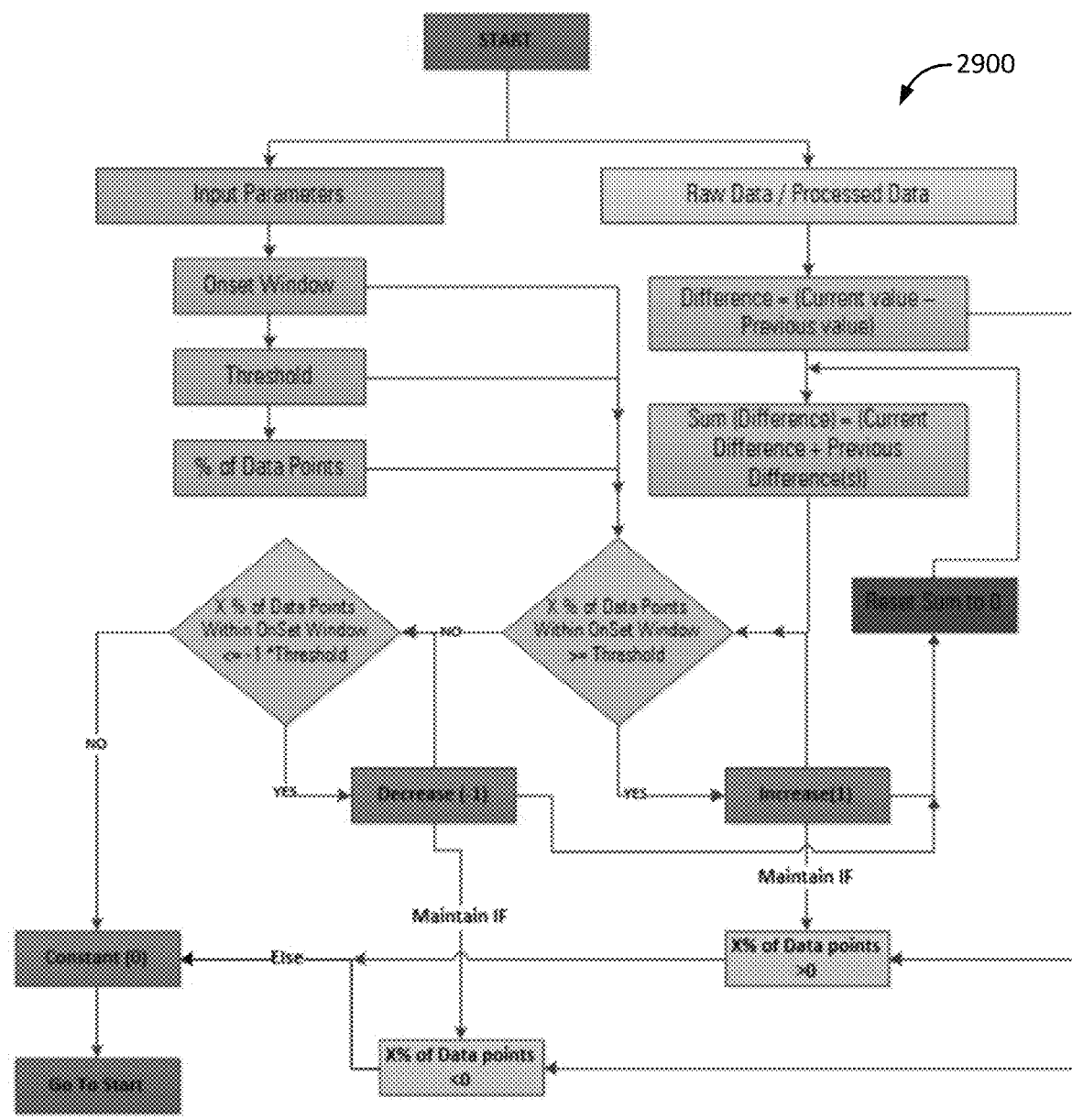
FIG. 29 illustrates an example flowchart for value change, in accordance with one or more implementations.

FIG. 29 illustrates an example flowchart for a value change monitoring system, in accordance with one or more implementations. This example flowchart is described in greater detail above. As illustrated, inputs may include an onset window, a threshold value, and a given percentage of data points. Raw data/process data may include a difference between the current value and the previous value and a sum between the current difference and the previous difference. As described above, one or more operations may be applied to the data, such as determining whether the given percent of data points is within the onset window threshold, and what percentage of the data may be greater than or less than 0.

In implementations, an example monitoring system may include a riser/riserless monitoring system. The riser/riserless monitoring system may be configured to identify the riser or riserless operation status. The corresponding status mode may be used to enable/disable one or more alarms. The riser status may be based on booster pump, flowout % data signature, and/or user manual input through a graphical user interface. The riser/riserless monitoring system may reduce false alarms, identify riserless operations, distinguish between land and offshore rigs, and identify booster pumps. The one or more alarms and/or monitoring systems that are dependent on a riser or riserless operation may include a gain in active system alarm, a gain in trip tank (1, 2, and 3) alarm, gain in trip tank while tripping alarm, gain in mini trip tank alarm, increase in flowout % alarm, increase in flowout average alarm, well not lined up on trip tank alarm, increase in choke and kill line alarm, abnormal versus calculated gain while drilling alarm, accelerated gain in active system alarm, losses in active system alarm, increase in flowout % while tripping alarm, constant flowout % with increase in TSPM alarm, and/or other alarms.

The riser/riserless monitoring system may include mud flow in, SPM(x), and flowout % as raw data inputs. Total SPM, transfer to trip tank (TT), and transfer from TT may be calculated as inputs for the riser/riserless monitoring system.

The riser/riserless monitoring system may include a riser status component. The riser status component may include one or more operations. One operation may include a flow out % condition. The flow out % condition may be based on observing the consistent flowout %. Consistent flowout % may be based on about 95% of the data value of the flowout % being greater than about 5% over about a 6 min window. Consistent flowout % may be based on no fluid transfer through the flow line causing the flowout % to increase. If fluid transfer function values are null, this operation may be skipped. Fluid transfer function values may be null when all data values of the transfer_to_TT channel equal 0 over the last about 6 min. Fluid transfer function values may be null when all data values of the transfer_from_TT channel equal 0 over the last about 6 min.

The riser/riserless monitoring system may include a booster pump identification component. The booster pump identification component may include one or more operations to identify boosting a pump. One operation may include determining when there is no increase in a choke line pressure. Determining when there is no increase in a choke line pressure may include getting about a 30 sec running average. Determining when there is no increase in a choke line pressure may include applying the average data to the value change monitoring system to determine a trend.

One operation may include determining when there is no increase in kill line pressure. Determining when there is no increase in kill line pressure may include getting about a 30 sec running average. Determining when there is no increase in kill line pressure may include applying the average data to the value change monitoring system to determine a trend.

One operation may include determining whether SPM1 increased by about 5 spm and mud flow in <about 10 (i.e., boosting riser with pump #1). One operation may include determining whether SPM2 increased by about 5 spm and mud flow in <about 10 (i.e., boosting riser with pump #2). One operation may include determining whether SPM3 increased by about 5 spm and mud flow in <about 10 (i.e., boosting riser with pump #3). One operation may include determining whether SPM4 increased by about 5 spm and mud flow in <about 10 (i.e., boosting riser with pump #4). One operation may include determining whether mud flow in >about 10 USgal/min, mud flow in is constant, and that SPM1 increased/decreased by about 5 spm. One operation may include determining whether mud flow in >about 10 USgal/min, mud flow in is constant, and SPM2 increased/decreased by about 5 spm. One operation may include determining whether mud flow in >about 10 USgal/min, mud flow in is constant, and SPM3 increased/decreased by about 5 spm. One operation may include determining whether mud flow in >about 10 USgal/min, mud flow in is constant and SPM4 increased/decreased by about 5 spm. One operation may include setting the riser/riserless monitoring system to riser mode.

The riser/riserless monitoring system may include a riserless mode and/or a riser mode. The riserless mode may disable all non-applicable safety alarms. The riserless mode may initiate scanning of the real-time data to identify a riser status, which may be updated automatically when the appropriate operations/conditions are met, and any applicable safety alarms may be enabled.

The data may be output as a table, where 0 may correspond to a riserless mode, 1 may correspond to a riser mode, and another value may correspond to the booster pump. The riser mode may be changed dynamically by a user via the graphical user interface.

Figure 30:
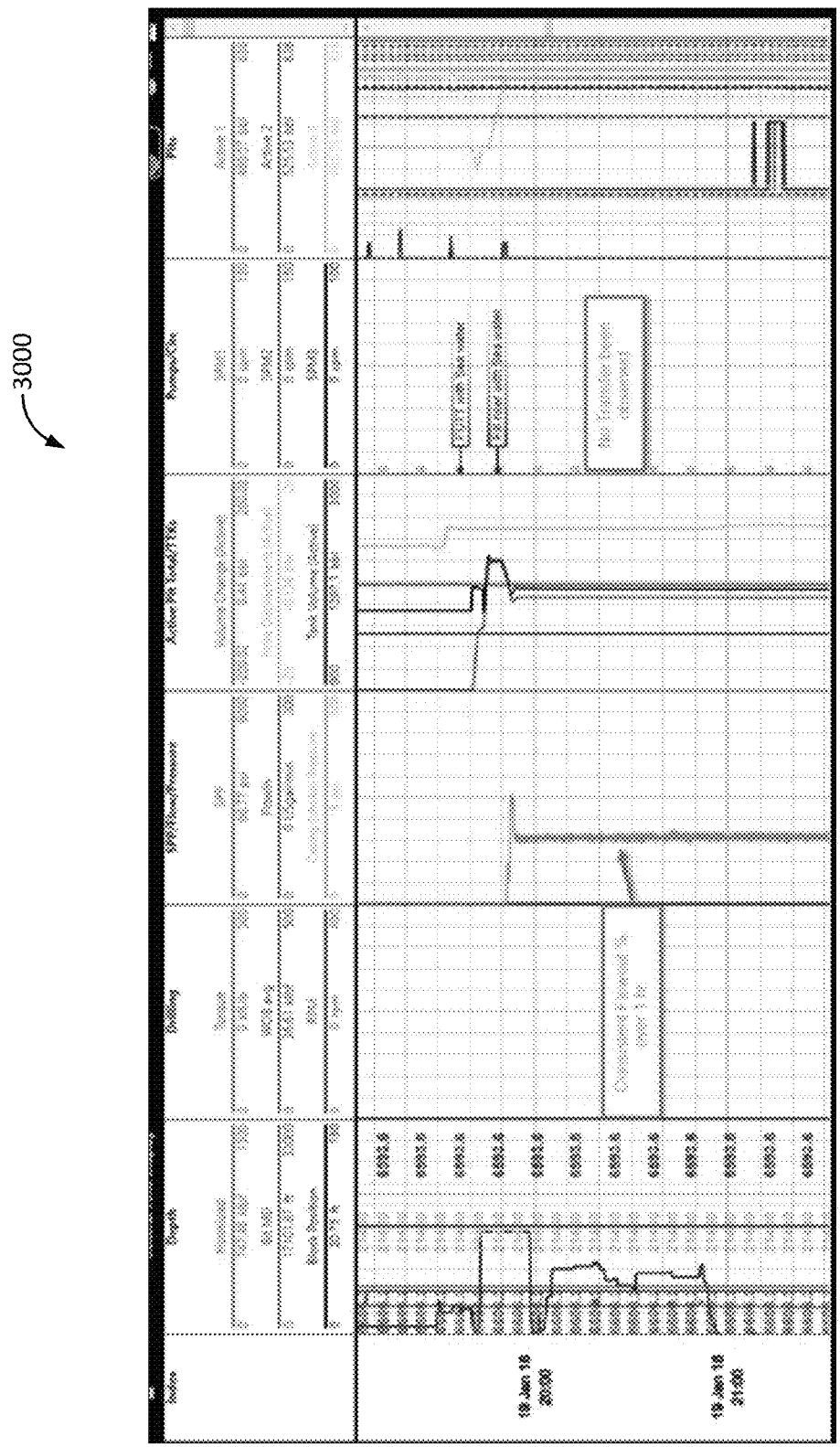
FIG. 30 is a graph illustrating riser/riserless monitoring with a flowout percent condition, in accordance with one or more implementations.

FIG. 30 is a graph illustrating riser/riserless monitoring with a flowout percent condition, in accordance with one or more implementations. As illustrated, the flowout percent data signatures may change when connecting the riser.

Figure 31:
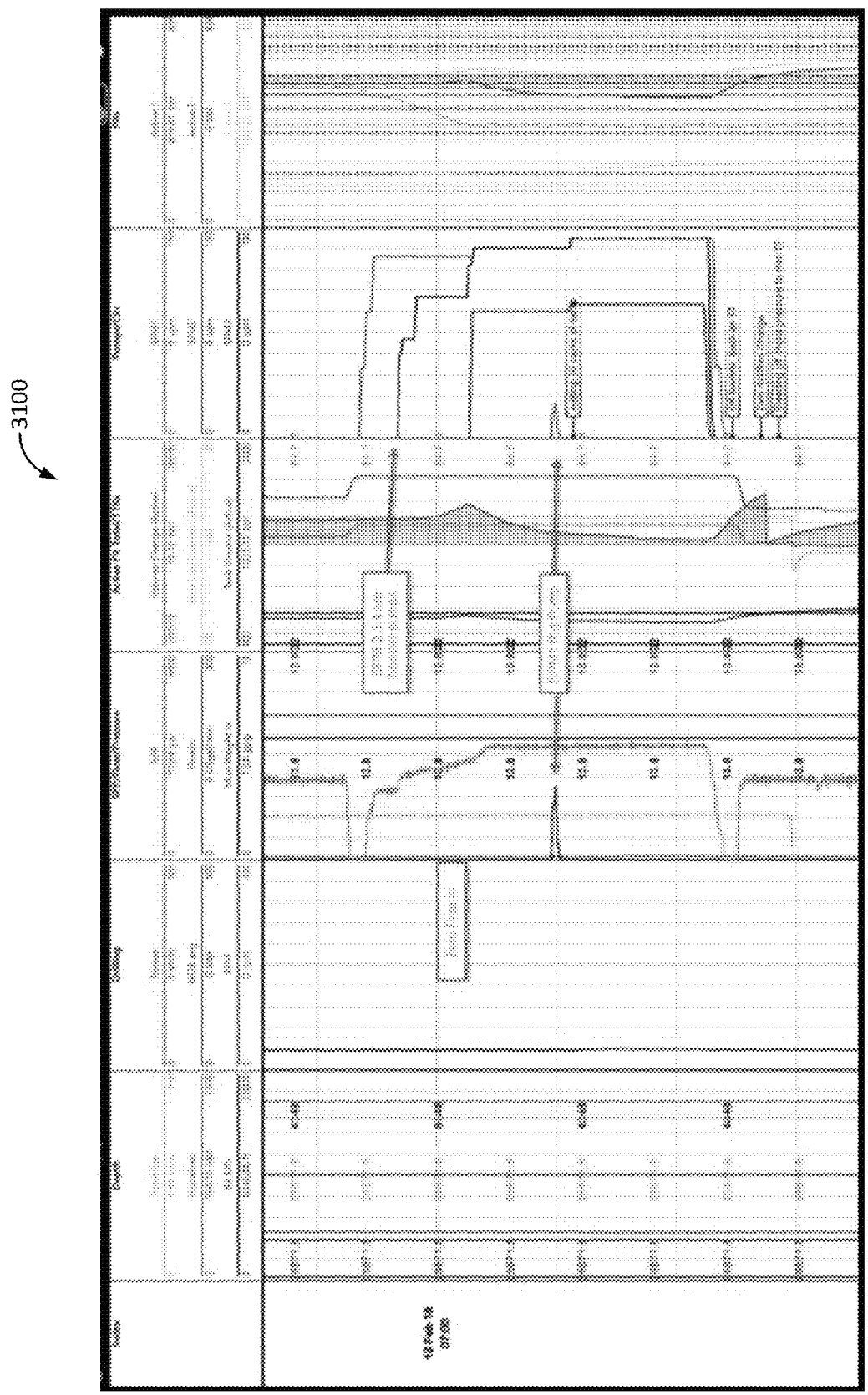
FIG. 31 is a graph illustrating riser/riserless monitoring with a booster pump condition, in accordance with one or more implementations.

FIG. 31 is a graph illustrating riser/riserless monitoring with a booster pump condition, in accordance with one or more implementations. As illustrated, booster pumps may be identified when an increase in pump strokes does not affect mud flow in.

Figure 32:
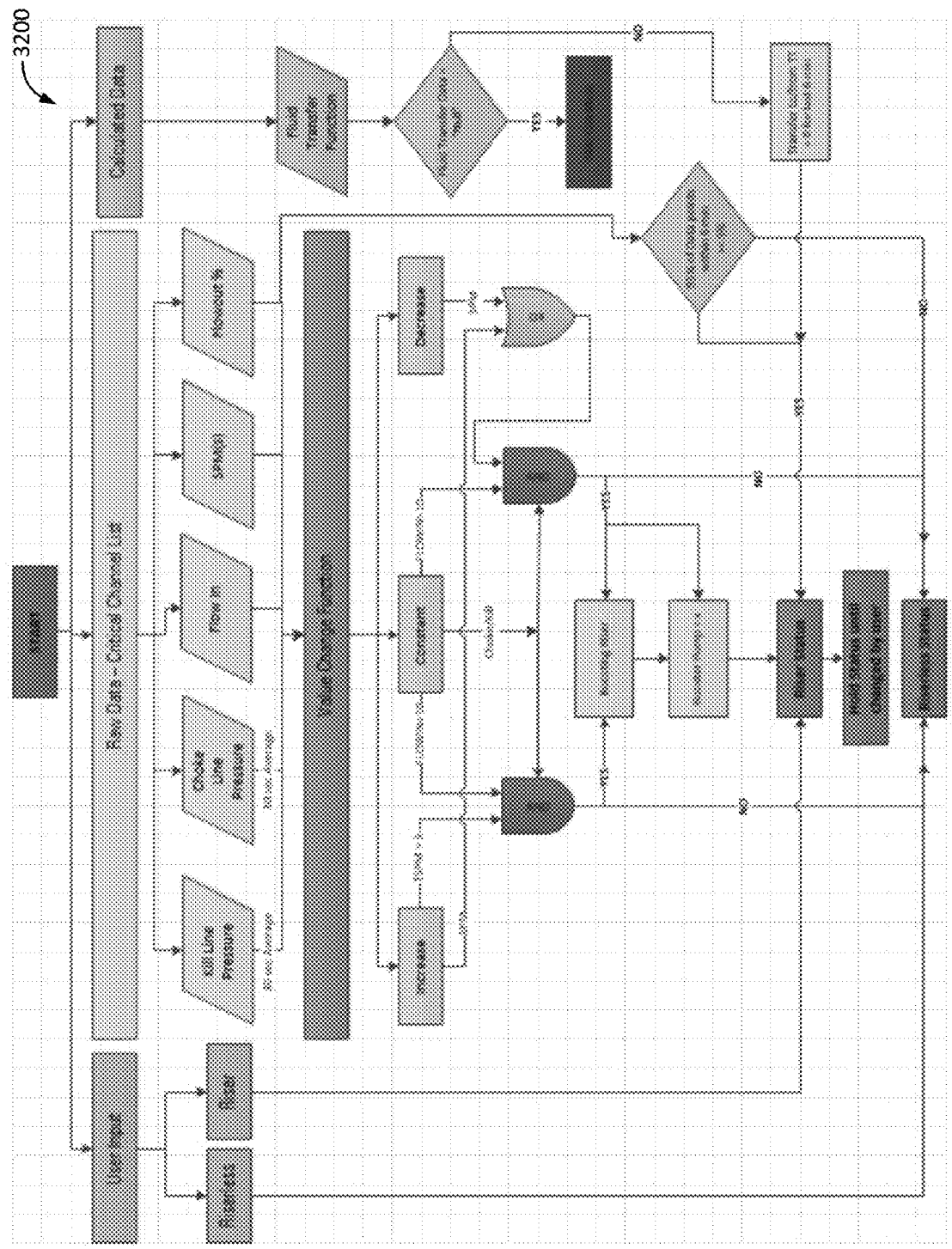
FIG. 32 illustrates an example flowchart for a riser/riserless monitoring system, in accordance with one or more implementations.

FIG. 32 illustrates an example flowchart for a riser/riserless monitoring system, in accordance with one or more implementations. This example flowchart is described in greater detail above. User input, raw data, and calculated data may be used as input. The user input may be selecting a riser/riserless status. One or more operations may be applied to the raw data, such as a kill line pressure operation, a choke line pressure operation, a flow in operation, an SPM operation, and a flowout percent operation. The processed data may be sent to the value change monitoring system and/or compared to see whether about 95% of the data points within about 6 minutes are less than or equal to about 5%. The value change monitoring system may track changes to the output values of the riser/riserless monitoring system, which may be used to identify a riser/riserless mode.

In implementations, the riser/riserless monitoring system may include a widget. This widget may be displayed in the graphical user interface. The widget may include two options to enforce a status: a riser mode and a riserless mode. The riser mode may be used when connecting to the riser. This may update automatically from a riserless mode when boosting the riser and/or based on the flowout % signature after latching the LMRP. An LMRP may be a lower marine riser package that is coupled to the sub sea blowup preventer system. During disconnect operations, the LMRP may be uncoupled from the BOP while the BOP is coupled with the wellhead. When the riser model is selected or automatically updated, all the applicable process safety alarms may be enabled.

Selecting a riserless mode may disable all non-applicable safety alarms, except, in some implementations, a stand pipe pressure alarm and a drilling break alarm. The riserless mode can be used when disconnecting the riser during rig move operations, emergency disconnect operations, etc.

In implementations, an example monitoring system may include a fluid transfer monitoring system. The fluid transfer monitoring system may be configured to determine the transfer between trip tanks, active systems, and/or pits. The fluid transfer monitoring system may identify the source and destination of each transfer to produce four different dynamic channels that can be used by different alarms and monitoring systems.

The fluid transfer monitoring system may include threshold values as inputs.

The fluid transfer monitoring system may include a data alignment component, as described above. The fluid transfer monitoring system may include a threshold value component. For pits, a cumulative direction threshold value may be about 10 bbl; a direction threshold value may be about 2.5 bbl; a counter direction threshold value may be about 5 bbl; a change threshold value may be about 0.1 bbl; and/or a filter threshold value may be about 10 bbl. For an active system, a cumulative direction threshold value may be about 5 bbl; a direction threshold value may be about 2.5 bbl; a counter direction threshold value may be about 5 bbl; a change threshold value may be about 0.1 bbl; and/or a filter threshold value may be about 10 bbl. For trip tanks, a cumulative direction threshold value may be about 2.5 bbl; a direction threshold value may be about 1.25 bbl; a counter direction threshold value may be about 1.25 bbl; a change threshold value may be about 0.1 bbl; and/or a filter threshold value may be about 10 bbl.

Figure 33:
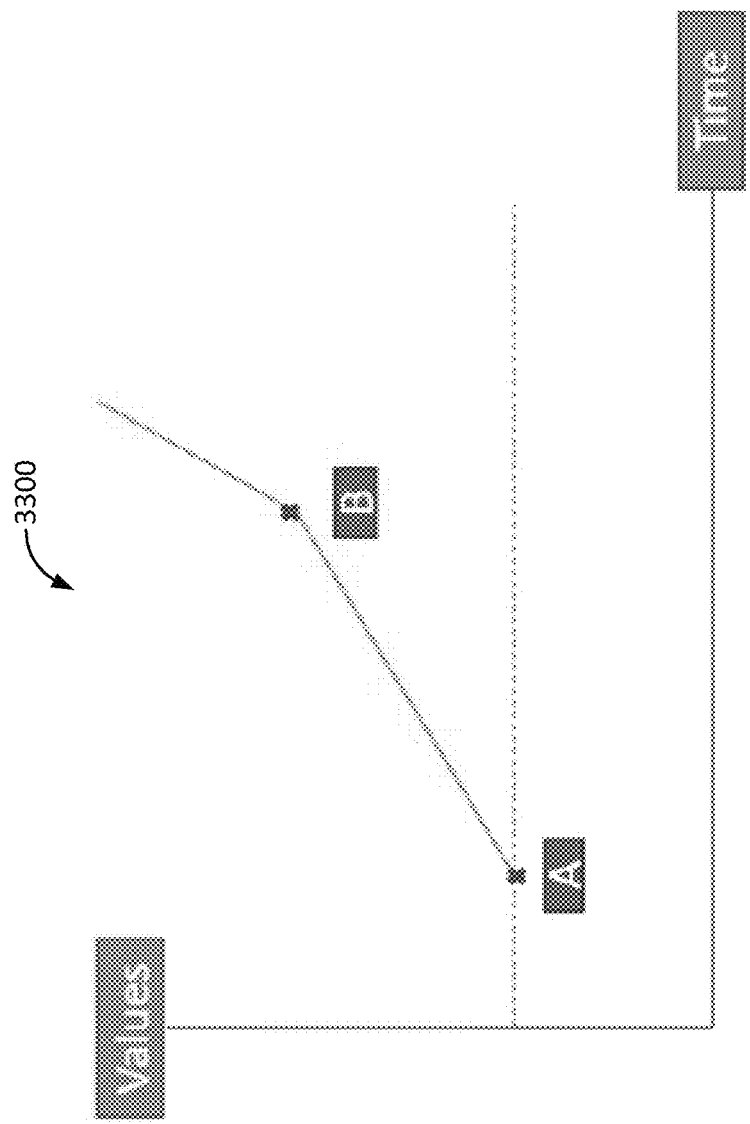
FIG. 33 is a graph illustrating example trend analysis, in accordance with one or more implementations.

One operation of the fluid transfer monitoring system may include putting trip tanks in a list and assigning numeric values for each (e.g., TT1=1, TT2=2, TT3=3 and TT4=4). One operation of the fluid transfer monitoring system may include getting about a 30 sec average for trip tank(s), the active system, and each individual pit. One operation of the fluid transfer monitoring system may include applying the average to the pit trend function. The result may indicate an increase flag and/or a decrease flag. One operation of the fluid transfer monitoring system may include determining the value and start time index when the trend crosses over the threshold value. One operation of the fluid transfer monitoring system may include moving the start value from A to B when the direction start time is determined and the trend increases at a higher threshold. FIG. 33 is a graph illustrating example trend analysis, in accordance with one or more implementations. As illustrated, a new trend may begin at each of A and B.

One operation of the fluid transfer monitoring system may include resetting the direction start time if the direction switches from a positive direction to a negative direction and/or if the direction is below the direction threshold value. One operation of the fluid transfer monitoring system may include setting the transfer to pit AS channel to 1 if the active system trend is increasing, any of the pits are decreasing, and/or the trip tank(s) is decreasing. One operation of the fluid transfer monitoring system may include setting the transfer from Pit AS channel to 1 if the active system trend is decreasing, any of the pits are increasing, and/or the trip tank(s) is increasing. One operation of the fluid transfer monitoring system may include transferring to TT=12 if trip tank 1 and 2 are increasing, the trip tank(s) is decreasing, the active system is decreasing, and/or the pits are decreasing. One operation of the fluid transfer monitoring system may include transferring from TT=12 if trip tank 1 and 2 are decreasing, trip tank(s) is increasing, active system is increasing, and/or pits are increasing. One operation of the fluid transfer monitoring system may include applying the same operations and/or components for the reset of other scenarios (e.g., transfer from TT1 to TT2, TT1 to active system, etc.). One operation of the fluid transfer monitoring system may include keeping all output alive for about 60 secs from the last time the condition is true.

The fluid transfer monitoring system may include transfer to active system, transfer from active system, transfer to trip tank, and transfer from trip tank as outputs, which may be output as 1, 2, 3, 12, and/or 23. These may be presented via a table, or otherwise.

In implementations, an example monitoring system may include an abnormal versus calculated pits gain while drilling monitoring system. The abnormal versus calculated pits gain while drilling monitoring system may include a time based alarm for process safety. The abnormal versus calculated pits gain while drilling monitoring system may include one or more operations. One operation may include determining what the rig state may be equal to. This may be based on the gains/losses in the active system, as described herein. In implementations, where rig state may be set to drilling and sliding in the manage by exception monitoring (MBE) system, this may create false/missed alarms during slow drilling.

The abnormal versus calculated pits gain while drilling monitoring system may include a riser identifier channel used to distinguish between riser and riserless operations. In implementations, this may be used for offshore wells with risers. When the riser identifier channel=1, the abnormal versus calculated pits gain while drilling monitoring system may automatically identify the riser status. When the riser identifier channel=3, the abnormal versus calculated pits gain while drilling monitoring system may have been manually set to the riser status by a user. The riser identifier channel may be a reference channel. This channel may be evaluated when the non-reference channels conditions are valid. This may speed up evaluation time for the MBE system.

One operation for the abnormal versus calculated pits gain while drilling monitoring system may include determining whether the drilling alert code is 1, 2, and/or 3. One operation may include determining whether the cumulative alert code>0.

In implementations, an example monitoring system may include an accelerated gains in active systems monitoring system. The accelerated gains in active systems monitoring system may include a time based alarm for process safety. The accelerated gains in active systems monitoring system may include one or more operations. One operation may include identifying a rig state. Circulation activities related to a rig state may include reaming, back reaming, circulation with rotation, and/or circulation without rotation. Drilling activities related to a rig state may include drilling and/or sliding.

The accelerated gains in active systems monitoring system may include a riser identifier channel used to distinguish between riser and riserless operations, and may be similar to the riser identifier channel described above. One operation for the accelerated gains in active systems monitoring system may include determining whether the drilling alert code is 3. One operation for the accelerated gains in active systems monitoring system may include determining whether the circulation alert code is 2.

In implementations, an example monitoring system may include a losses in active systems monitoring system. The losses in active systems monitoring system may include a time based alarm for process safety. The losses in active systems monitoring system may include one or more operations. One operation may include identifying a rig state, similar to that described in the abnormal versus calculated pits gain while drilling monitoring system.

The losses in active systems monitoring system may include a riser identifier channel, similar to the one described in abnormal versus calculated pits gain while drilling monitoring system. One operation of the losses in active systems monitoring system may include determining whether a drilling loss alert code>0. One operation of the losses in active systems monitoring system may include determining whether an average drilling loss alert code>0.

In implementations, an example monitoring system may include a gains in active systems monitoring system. The gains in active systems monitoring system may include a time based alarm for process safety. The gains in active systems monitoring system may include one or more operations. One operation may include identifying a rig state, similar to that described in the abnormal versus calculated pits gain while drilling monitoring system.

The gains in active systems monitoring system may include a riser identifier channel, similar to the one described in abnormal versus calculated pits gain while drilling monitoring system. One operation of the gains in active systems monitoring system may include determining whether a circulation alert code=0. One operation of the gains in active systems monitoring system may include determining whether an circulation alert code>2.

In implementations, an example monitoring system may include an increases in hole displacement over a given number of stands monitoring system. The increases in hole displacement over a given number of stands monitoring system may include a time based alarm for process safety. The increase in hole displacement over a given number of stands monitoring system may include one or more operations. One operation may include identifying a rig state, as described above. The increase in hole displacement over a given number of stands monitoring system may include a riser identifier, as described above. One operation of the increase in hole displacement over a given number of stands monitoring system may include a per-stand hole displacement condition. This condition may be valid if a change in the displacement direction was noticed over a given number of stands during high losses.

Figure 34:
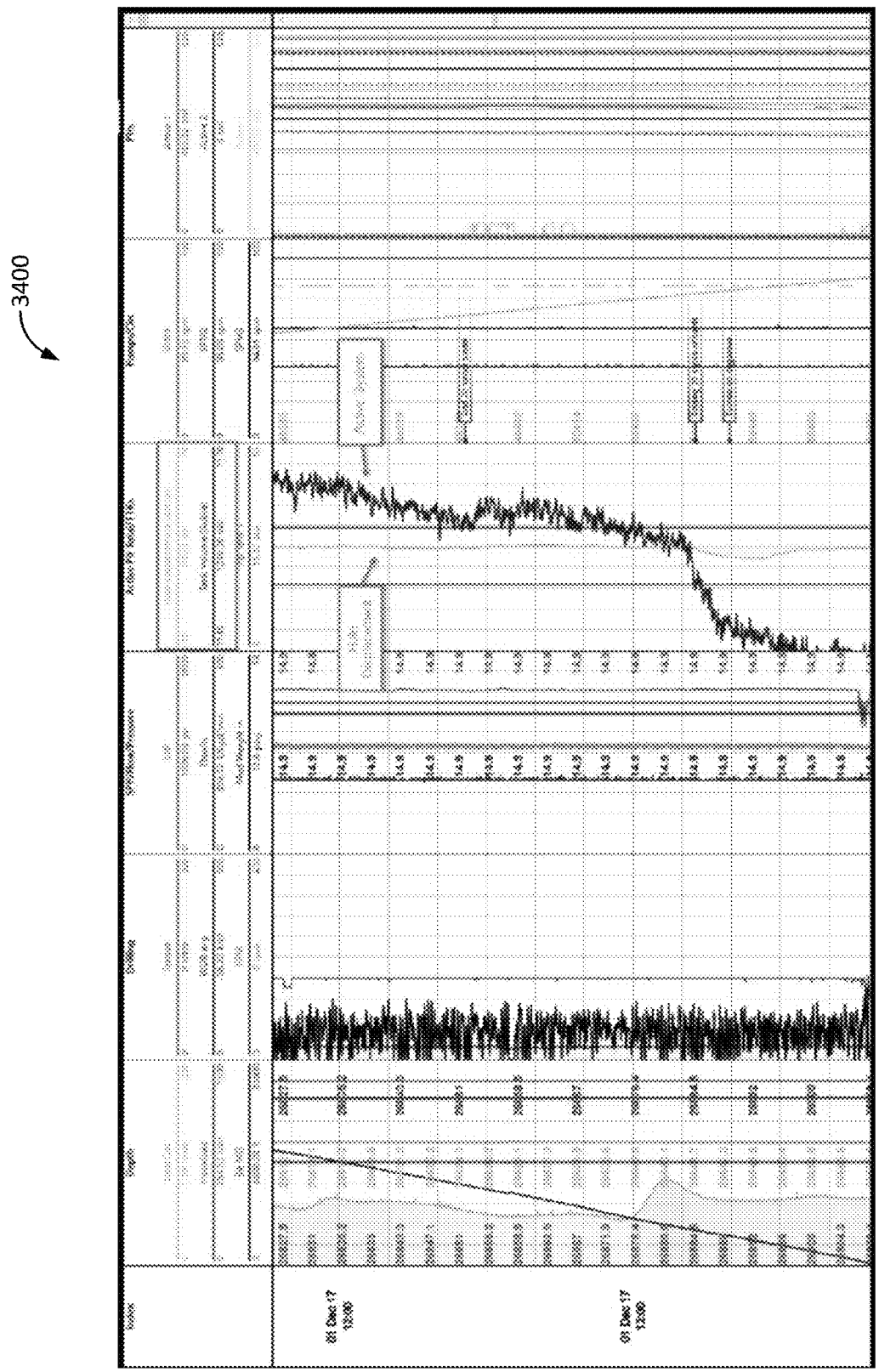
FIG. 34 illustrates example hole displacement vs active system raw data, in accordance with one or more implementations.

FIG. 34 illustrates example hole displacement versus active system raw data, in accordance with one or more implementations. The data may be taken from an offshore well where a 10⅝"×12" Hole Section is being drilled with the reamer open. As illustrated, the active system is fluctuating with about +/−5 bbl, which can make detecting small gains (1 bbl) challenging. The Gain/Loss monitoring system may use the integrated signal processing approach, as described above, to filter out the noise from the active system and produce a hole displacement curve that can be used to monitor the displacement in real-time. As illustrated, the fluctuation in the hole displacement curve is around +/−0.02 bbl which is better than the active system raw data.

Figure 35:
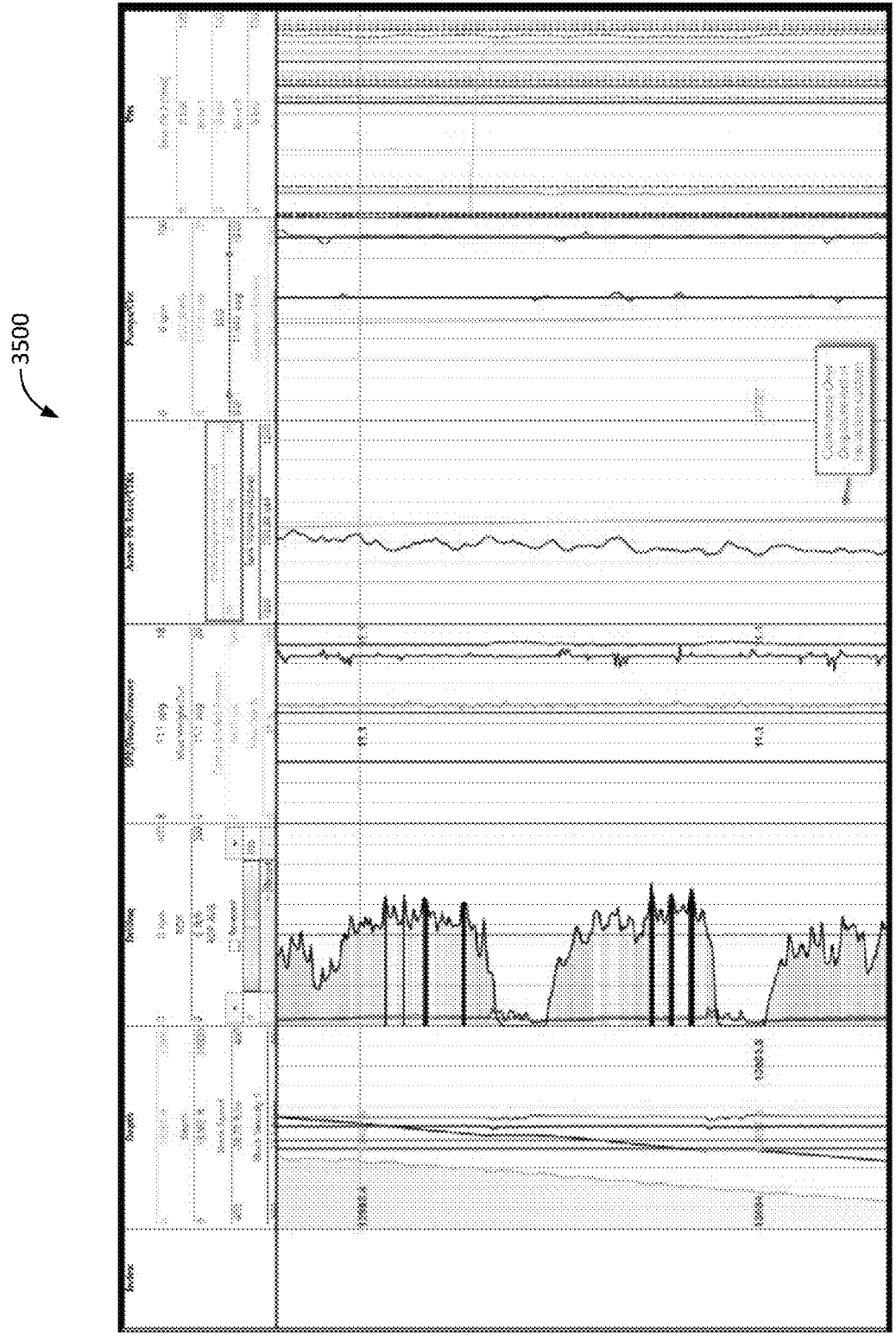
FIG. 35 illustrates example hole displacement calculation outputs, in accordance with one or more implementations.

FIG. 35 illustrates example hole displacement calculation outputs, in accordance with one or more implementations. The data may be taken from an offshore well where a 18⅛"×21" hole section is being drilled with the reamer open. As illustrated, the active system is decreasing while drilling with the reamer open. Using existing technology, the end user may not be able to determine if the hole displacement is taking the right amount of fluid or not. Using the presently disclosed technology the net gain loss may be calculated (e.g., the difference between theoretical and actual displacement) in real time. While the active system is decreasing, the hole is not taking the right amount of fluid as illustrated by the hole displacement curve. The hole displacement curve illustrates a gradual increase in the net gain loss over a period of time.

Figure 36:
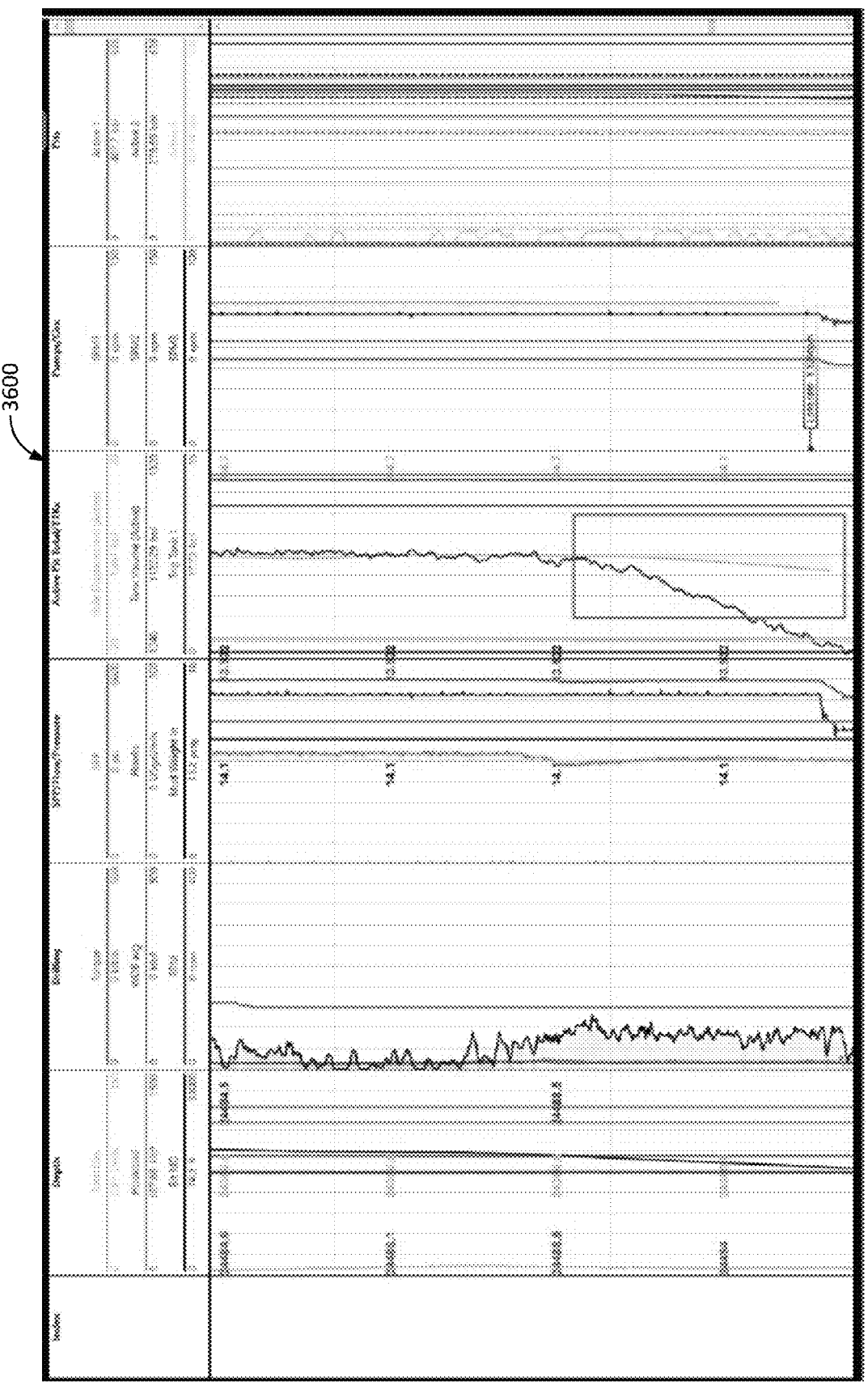
FIG. 36 illustrates example losses in active system while drilling, in accordance with one or more implementations.

FIG. 36 illustrates example losses in active system while drilling, in accordance with one or more implementations. The data may be taken where a 12¼"×14½" hole section is being drilled with the reamer open. Losses may be observed around 200 bbl/hr while drilling a head at 24495'. Losses start when the 14.1 SBM returns to surface. As illustrated, the losses are more easily identified using the hole displacement curve, than trying to sift through the data otherwise.

Figure 37:
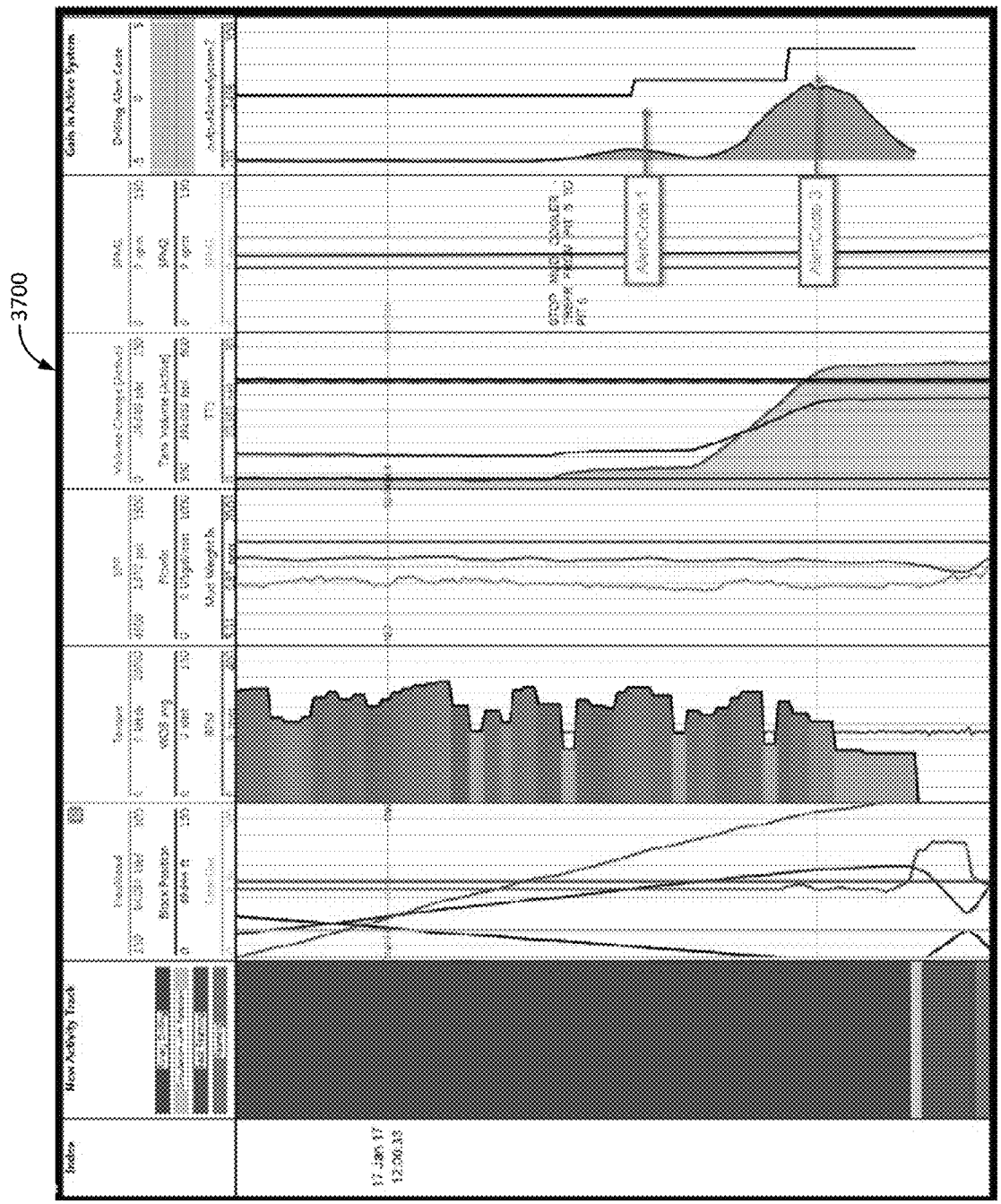
FIG. 37 illustrates example gain/loss monitoring with drilling alert codes, in accordance with one or more implementations.

FIG. 37 illustrates example gain/loss monitoring with drilling alert codes, in accordance with one or more implementations. The graph may be for an accelerated gain in active system while adding fluid. As illustrated, the monitoring system generates alert code 1 when the initial gain in the active system while drilling exceeds about 1.5 bbl for about 60 sec. Alert Code 3 may be generated when the rate, or returns, while gaining is doubled. This condition may be designed to capture the abnormal gain in the active system while adding fluid to the system while drilling.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A computer-implemented method for remote monitoring of a system usable in a subsurface volume, the method being implemented in a computer system that includes one or more physical computer processors, non-transient electronic storage, and a graphical user interface, the method comprising:
    obtaining, from the non-transient electronic storage, system data for the system usable in the subsurface volume, wherein the system data identifies multiple parameter values corresponding to one or more parameters as a function of time;
    identifying, with the one or more physical computer processors, multiple alert time values corresponding to a time interval where the multiple parameter values exceed a threshold range, wherein the threshold range is based on at least a trend of the system data as a function of time, and wherein the trend is based on a change in a weight from a first subset of the system data to a second subset of the system data, wherein the weight is a weighted average;
    generating, with the one or more physical computer processors, a representation of the subsurface system using visual effects to depict at least a portion of the system data and at least a portion of the multiple alert times; and
    displaying, via the graphical user interface, the representation.

2. The computer-implemented method of claim 1, wherein identifying the multiple alert times time values, generating the representation, and displaying the representation is dynamic.

3. The computer-implemented method of claim 1, wherein the one or more parameters comprises one or more of a pick-up weight parameter, a slack-off weight parameter, a position parameter, a torque parameter, a run speed parameter, a pressure parameter, a flow rate parameter, a pump rate parameter, a revolution per minute parameter, a weight-on-bit parameter, a hook load parameter, a mud weight parameter, a mud level parameter, a density parameter, a rate of penetration parameter, and a depth return parameter.

4. The computer-implemented method of claim 1, wherein the system data is weighted based on an environmental effect on the system.

5. The computer-implemented method of claim 4, wherein the environmental effect comprises one or more of a pump activation and a pump deactivation.

6. The computer-implemented method of claim 1, wherein the system data is generated by one or more sensors on the system.

7. The computer-implemented method of claim 6, wherein the one or more sensors comprise one or more of a weight sensor, a force sensor, a location sensor, a torque sensor, a pressure sensor, a flow sensor, a revolution per minute sensor, a rotary sensor, a proximity sensor, a hook-load sensor, a pit volume sensor, and a density sensor.

8. The computer-implemented method of claim 1, wherein the threshold range is based on at least refined system data, wherein the refined system data includes data from a first shift in the system data to a second shift in the system data.

9. The computer-implemented method of claim 8, wherein the first shift is based on a change in a weight from a first part of the system data to a second part of the system data.

10. The computer-implemented method of claim 1, wherein the threshold range is based on at least a maximum parameter value and a minimum parameter value corresponding to safety limits of the system.

11. The computer-implemented method of claim 1, wherein the threshold range is a threshold value that varies from the trend by greater than 5%.

12. A system configured for remote monitoring of a system usable in a subsurface volume of interest, the system comprising:
    non-transient electronic storage;
    a graphical user interface; and
    one or more hardware processors configured by machine-readable instructions to:
        obtain, from the non-transient electronic storage, system data for the system usable in the subsurface volume of interest, wherein the system data specifies multiple parameter values corresponding to one or more parameters as a function of time;
        identify, with the one or more physical computer processors, multiple alert times specifying multiple time values corresponding to a time interval where the multiple parameter values exceed a threshold range, wherein the threshold range is based on at least a trend of the system data as a function of time, and wherein the trend is based on a change in a weight from a first subset of the system data to a second subset of the system data, wherein the weight is a weighted average;
        generate, with the one or more physical computer processors, a representation of the subsurface system using visual effects to depict at least a portion of the system data and at least a portion of the multiple alert times; and
        display, via the graphical user interface, the representation.

13. The system of claim 12, wherein identifying the multiple alert times, generating the representation, and displaying the representation is dynamic.

14. The system of claim 12, wherein the one or more parameters comprises one or more of a pick-up weight parameter, a slack-off weight parameter, a position parameter, a torque parameter, a run speed parameter, a pressure parameter, a flow rate parameter, a pump rate parameter, a revolution per minute parameter, a weight-on-bit parameter, a hook load parameter, a mud weight parameter, a mud level parameter, a density parameter, a rate of penetration parameter, and a depth return parameter.

15. The system of claim 12, wherein the system data is weighted based on an environmental effect on the system.

16. The system of claim 15, wherein the environmental effect comprises one or more of a pump activation and a pump deactivation.

17. The system of claim 12, wherein the system data is generated by one or more sensors on the system.

18. The system of claim 12, wherein the one or more sensors comprise one or more of a weight sensor, a force sensor, a location sensor, a torque sensor, a pressure sensor, a flow sensor, a revolution per minute sensor, a rotary sensor, a proximity sensor, a hook-load sensor, a pit volume sensor, and a density sensor.

19. A non-transient computer-readable storage medium having instructions embodied thereon, the instructions being executable by one or more processors to perform a method for remote monitoring of a system usable in a subsurface volume of interest, the method comprising:

obtaining, from the non-transient electronic storage, system data for the system usable in the subsurface volume of interest, wherein the system data specifies multiple parameter values corresponding to one or more parameters as a function of time;

identifying, with the one or more physical computer processors, multiple alert times specifying multiple time values corresponding to a time interval where the multiple parameter values exceed a threshold range, wherein the threshold range is based on at least a trend of the system data as a function of time, and wherein the trend is based on a change in a weight from a first subset of the system data to a second subset of the system data, wherein the weight is a weighted average;

generating, with the one or more physical computer processors, a representation of the subsurface system using visual effects to depict at least a portion of the system data and at least a portion of the multiple alert times; and displaying, via the graphical user interface, the representation.

* * * * *